(12) United States Patent
Schaffer et al.

(10) Patent No.: US 10,288,254 B2
(45) Date of Patent: May 14, 2019

(54) FRONT-LIT REFLECTIVE DISPLAY DEVICE

(75) Inventors: Kevin R. Schaffer, Woodbury, MN (US); David Scott Thompson, West Lakeland, MN (US); Zhaohui Yang, North Oaks, MN (US); Encai Hao, Woodbury, MN (US); Audrey A. Sherman, St. Paul, MN (US); Michael A. Meis, Stillwater, MN (US); William J. Bryan, Mahtomedi, MN (US); John A. Wheatley, Lake Elmo, MN (US); Joseph W. Woody, St. Paul, MN (US); Steven D. Solomonson, Shoreview, MN (US); Matthew S. Stay, Minneapolis, MN (US); Mikhail L. Pekurovsky, Bloomington, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1512 days.

(21) Appl. No.: 13/984,239

(22) PCT Filed: Feb. 23, 2012

(86) PCT No.: PCT/US2012/026237
§ 371 (c)(1),
(2), (4) Date: Sep. 9, 2013

(87) PCT Pub. No.: WO2012/116129
PCT Pub. Date: Aug. 30, 2012

(65) Prior Publication Data
US 2014/0003086 A1    Jan. 2, 2014
US 2015/0330597 A2    Nov. 19, 2015

Related U.S. Application Data

(60) Provisional application No. 61/446,740, filed on Feb. 25, 2011.

(51) Int. Cl.
F21V 7/04        (2006.01)
F21V 5/00        (2018.01)
(Continued)

(52) U.S. Cl.
CPC ............... *F21V 5/00* (2013.01); *B82Y 30/00* (2013.01); *G02B 6/005* (2013.01); *G02B 6/0051* (2013.01);
(Continued)

(58) Field of Classification Search
CPC ..... G02F 2001/133616; Y10S 977/834; G02B 5/0247; G02B 5/0278; G02B 6/0051; G02B 6/005
(Continued)

(56) References Cited

U.S. PATENT DOCUMENTS 3,718,712 A    2/1973    Tushaus
3,960,438 A    6/1976    Bonne
(Continued)

FOREIGN PATENT DOCUMENTS

EP    1293822    3/2003
EP    1936428    9/2013
(Continued)

OTHER PUBLICATIONS

Fisher, Selection of Engineering Materials and Adhesives, Published 2005, pp. 116, NPL'001.*
(Continued)

*Primary Examiner* — Bryon T Gyllstrom
*Assistant Examiner* — James M Endo
(74) *Attorney, Agent, or Firm* — Clifton F. Richardson

(57) ABSTRACT

This application describes a front-lit reflective display assembly including a reflective display and an illumination article for front-lighting the display when the article is optically coupled to a light source. The illumination article
(Continued)

includes a variable index light extraction layer optically coupled to a lightguide. The variable index light extraction layer has first and second regions, the first region comprising nanovoided polymeric material, the second region comprising the nanovoided polymeric material and an additional material, the first and second regions being disposed such that for light being transported at a supercritical angle in the lightguide, the variable index light extraction layer selectively extracts the light in a predetermined way based on the geometric arrangement of the first and second regions. Front-lit reflective display devices including the front-lit reflective display assembly optically coupled to a light source are also described.

22 Claims, 15 Drawing Sheets

(51) Int. Cl.
  *B82Y 30/00* (2011.01)
  *G02F 1/1335* (2006.01)
  *F21V 8/00* (2006.01)
  *G02F 1/167* (2019.01)
  *B82Y 20/00* (2011.01)

(52) U.S. Cl.
  CPC ........ *G02F 1/133553* (2013.01); *B82Y 20/00* (2013.01); *G02F 1/167* (2013.01); *G02F 2001/133616* (2013.01); *Y10S 977/834* (2013.01)

(58) Field of Classification Search
  USPC ............ 362/603; 428/322.2, 305.5; 359/567, 359/599, 707
  See application file for complete search history.

(56) References Cited

U.S. PATENT DOCUMENTS

| | | | |
|---|---|---|---|
| 4,233,603 A | 11/1980 | Castleberry | |
| 4,373,282 A | 2/1983 | Wragg | |
| 4,418,098 A * | 11/1983 | Maistrovich | B41M 5/0029 427/146 |
| 4,729,687 A * | 3/1988 | Arens | B41M 5/0029 401/196 |
| 4,751,615 A | 6/1988 | Abrams | |
| 5,354,598 A * | 10/1994 | Arens | A63F 3/0685 428/195.1 |
| 5,389,426 A * | 2/1995 | Arens | A63F 3/06 156/156 |
| 5,578,362 A * | 11/1996 | Reinhardt | B24B 37/26 257/E21.219 |
| 5,845,038 A | 12/1998 | Lundin | |
| 6,108,059 A * | 8/2000 | Yang | G02B 6/0056 349/117 |
| 6,295,104 B1 * | 9/2001 | Egawa | G02B 6/0038 349/63 |
| 6,347,874 B1 | 2/2002 | Boyd | |
| 6,367,941 B2 | 4/2002 | Lea | |
| 6,490,401 B2 * | 12/2002 | Cornelissen | G02B 6/0038 362/559 |
| 6,569,521 B1 | 5/2003 | Sheridan | |
| 6,592,233 B1 * | 7/2003 | Parikka | G02B 6/0028 362/23.15 |
| 7,004,610 B2 | 2/2006 | Yamashita et al. | |
| 7,005,394 B1 | 2/2006 | Ylitalo | |
| 7,057,814 B2 | 6/2006 | Boyd | |
| 7,163,330 B2 * | 1/2007 | Matsui | G02B 6/0036 362/561 |
| 7,163,332 B2 * | 1/2007 | Shimizu | G02B 6/0036 362/606 |
| 7,387,858 B2 | 6/2008 | Chari | |
| 7,525,126 B2 | 4/2009 | Leatherdale | |
| 7,652,656 B2 | 1/2010 | Chopra | |
| 7,862,898 B2 | 1/2011 | Sherman | |
| 7,892,649 B2 | 2/2011 | Sherman | |
| 7,997,783 B2 * | 8/2011 | Song | G02B 6/0036 362/339 |
| 2002/0015314 A1 * | 2/2002 | Umemoto | G02B 6/0038 362/561 |
| 2002/0085150 A1 | 7/2002 | Funamoto | |
| 2003/0118750 A1 * | 6/2003 | Bourdelais | G02B 5/0242 428/1.3 |
| 2003/0118807 A1 * | 6/2003 | Laney | G02B 5/0247 428/315.5 |
| 2003/0210367 A1 * | 11/2003 | Nakano | G02B 6/0038 349/113 |
| 2004/0005451 A1 * | 1/2004 | Kretman | C08J 5/18 428/317.9 |
| 2004/0066556 A1 * | 4/2004 | Dontula | G02B 5/0221 359/599 |
| 2004/0202879 A1 | 10/2004 | Xia | |
| 2005/0196552 A1 * | 9/2005 | Lehmann | G02B 1/111 428/1.1 |
| 2006/0029634 A1 | 2/2006 | Berg | |
| 2006/0186801 A1 | 8/2006 | West | |
| 2006/0209404 A1 * | 9/2006 | Kim | C08J 5/18 359/453 |
| 2006/0209416 A1 * | 9/2006 | Kim | G02B 5/0242 359/599 |
| 2006/0216523 A1 | 9/2006 | Takaki | |
| 2006/0275955 A1 | 12/2006 | Ku | |
| 2007/0065638 A1 * | 3/2007 | Wang | G02B 1/105 428/141 |
| 2007/0082969 A1 | 4/2007 | Malik | |
| 2007/0103910 A1 * | 5/2007 | Brickey | G02B 5/0242 362/311.04 |
| 2007/0201246 A1 | 8/2007 | Yeo | |
| 2007/0212535 A1 | 9/2007 | Sherman | |
| 2007/0236939 A1 * | 10/2007 | Ouderkirk | G02B 6/0053 362/339 |
| 2007/0257270 A1 | 11/2007 | Lu | |
| 2008/0049317 A1 * | 2/2008 | Hara | G02B 5/0242 359/487.02 |
| 2009/0117718 A1 * | 5/2009 | Lee | B82Y 30/00 438/492 |
| 2009/0201571 A1 * | 8/2009 | Gally | G02B 6/0041 359/315 |
| 2010/0031544 A1 * | 2/2010 | Hwang | G02B 5/02 40/564 |
| 2010/0031689 A1 | 2/2010 | Berghoff | |
| 2010/0067257 A1 | 3/2010 | Meis | |
| 2010/0075069 A1 * | 3/2010 | Laney | B32B 27/36 428/1.6 |
| 2010/0161653 A1 | 6/2010 | Kransow | |
| 2010/0227084 A1 | 9/2010 | Kato | |
| 2010/0265584 A1 | 10/2010 | Coggio | |
| 2011/0021053 A1 | 1/2011 | Li | |
| 2011/0039099 A1 | 2/2011 | Sherman | |
| 2011/0053460 A1 | 3/2011 | Culler | |
| 2011/0277361 A1 * | 11/2011 | Nichol | G02B 6/0018 40/541 |
| 2012/0063145 A1 | 3/2012 | Matsuzaki | |
| 2012/0069596 A1 * | 3/2012 | Vahabzadeh | G02F 1/157 362/603 |

FOREIGN PATENT DOCUMENTS

| | | |
|---|---|---|
| JP | 2009-212076 | 9/2009 |
| WO | WO 2009-085662 | 7/2009 |
| WO | WO 2009-089137 | 7/2009 |
| WO | WO 2009-114683 | 9/2009 |
| WO | WO 2010-005655 | 1/2010 |
| WO | WO 2010-017087 | 2/2010 |
| WO | WO 2010-077541 | 7/2010 |
| WO | WO 2010-078346 | 7/2010 |
| WO | WO 2010-120422 | 10/2010 |
| WO | WO 2010-120468 | 10/2010 |
| WO | WO 2010-120845 | 10/2010 |

(56) References Cited

FOREIGN PATENT DOCUMENTS

| WO | WO 2010-120864 | | 10/2010 | | |
| WO | WO 2010-120871 | | 10/2010 | | |
| WO | WO 2010-120971 | | 10/2010 | | |
| WO | WO 2010-121019 | | 10/2010 | | |
| WO | WO 2010-121054 | | 10/2010 | | |
| WO | WO 2010120845 | A2 * | 10/2010 | ........... | G02B 6/0051 |
| WO | WO 2010120864 | A1 * | 10/2010 | ........... | G02B 5/0242 |
| WO | WO 2010-132176 | | 11/2010 | | |
| WO | WO 2010-151563 | | 12/2010 | | |
| WO | WO 2011-050226 | | 4/2011 | | |
| WO | WO 2011-050228 | | 4/2011 | | |
| WO | WO 2011-050232 | | 4/2011 | | |
| WO | WO 2011-050233 | | 4/2011 | | |
| WO | WO 2011-050236 | | 4/2011 | | |
| WO | WO 2011-050254 | | 4/2011 | | |
| WO | WO 2011-050268 | | 4/2011 | | |
| WO | WO 2011-068754 | | 6/2011 | | |
| WO | WO 2011-071728 | | 6/2011 | | |
| WO | WO 2011-100277 | | 8/2011 | | |
| WO | WO 2011-129831 | | 10/2011 | | |
| WO | WO 2011-129832 | | 10/2011 | | |
| WO | WO 2011-129833 | | 10/2011 | | |
| WO | WO 2011-129848 | | 10/2011 | | |
| WO | WO 2012-061296 | | 5/2012 | | |
| WO | WO 2012-116129 | | 8/2012 | | |
| WO | WO 2012-116199 | | 8/2012 | | |
| WO | WO 2012-116215 | | 8/2012 | | |
| WO | WO 2012-158414 | | 11/2012 | | |

OTHER PUBLICATIONS

Feenstra, "Electrowetting Displays", Liquavista, May 2009, pp. 1-15.

Gusev, "Interferometric Modulator Displays (iMoD™): MEMS-Based Technology Inspired by Nature", Qualcomm MEMS Technologies, 2007, One page.

Hayes, "Video-Speed Electronic Paper Based on Electrowetting", Nature, Sep. 25, 2003, vol. 425, pp. 383-385.

Heikenfeld, "Electro fluidic displays using Young-Laplace Transposition of Brilliant Pigment Dispersions", Nature Photonics, Apr. 26, 2009, vol. 3, pp. 292-296.

Satas, Handbook of Pressure Sensitive Adhesive Technology, Second Ed., Van Nostrand Reinhold, New York, (1989), pp. v-xi (9 pages).

Yoon, "3-D Diffuser Lithography and Its Application to LCD/LED BacklightUnitand Flexible Front-light Unit," IDW, MEMS2-2, 2007, pp. 1345-1348.

International Search Report for PCT International Application No. PCT/US2012/026237, dated Apr. 12, 2012, 5 pages.

* cited by examiner

FRONT-LIT REFLECTIVE DISPLAY DEVICE

CROSS-REFERENCE TO RELATED APPLICATIONS

This application is related to the following U.S. Provisional Patent Applications, which were filed on even date herewith and incorporated by reference: "Illumination Article And Device For Front-Lighting Reflective Scattering Element" (U.S. Provisional Application No. 61/446,712) and "Variable Index Light Extraction Layer and Method of Illuminating With Same" (U.S. Provisional Application No. 61/446,642).

FIELD

This application relates generally to illuminated display devices, particularly display devices that are front-lit with an illumination device.

BACKGROUND

Illumination systems or devices, such as those used to illuminate objects or provide illumination in an electronic display system, utilize one or more optical layers for managing light emitted by one or more light sources. Often, the optical layers are required to have a desired optical transmittance, optical haze, optical clarity, or index of refraction. In many applications, the optical layers include a lightguide used in combination with an air layer and a light extraction layer such that light emitted by the light source(s) is transported within the lightguide, and the air layer and the extraction layer manage the light by supporting total internal reflection (TIR) and extraction of the light from the lightguide. A continuing need exists for optical films which are capable of managing light and are suitable for use in thin, flexible systems as well as in bulky systems.

SUMMARY

This application generally relates to front-lit reflective display devices and methods for illuminating reflective displays. Reflective display devices are front-lit using an illumination device comprising a light source used in conjunction with an illumination article. The illumination article includes, in particular, a variable index light extraction layer having regions of different properties such as refractive index, haze, transmission, clarity, or a combination thereof. The illumination article also includes a lightguide which delivers light from a light source to the variable index light extraction layer. The illumination article manages light emitted by the light source, thus increasing the spatial uniformity of the light, which is then delivered to the reflective display. This light is reflected by the reflective display toward a viewer such that images provided by the reflective display are illuminated.

In one aspect, this application describes a front-lit reflective display assembly including a reflective display and an illumination article. The illumination article includes a lightguide and a variable index light extraction layer, where the variable index light extraction layer is optically coupled to the lightguide and the reflective display. The variable index light extraction layer has first and second regions, where the first region includes nanovoided polymeric material, and the second region includes the nanovoided polymeric material and an additional material. The first and second regions are disposed such that for light emitted by a light source and injected into the lightguide, the variable index light extraction layer selectively extracts the light in a predetermined way based on the geometric arrangement of the first and second regions.

The illumination article can function as a high performance optical article having optical properties tailored for different applications. For example, the first region can have a haze less than about 5% and a clarity greater than about 90%, and/or the layer can have a light transmittance of greater than about 90%. For another example, the layer can have a haze less than about 10% and a clarity greater than about 90%. The first and second regions can be continuous across a transverse plane of the layer, or they can be discontinuous, arranged in a pattern or randomly disposed. The variable index light extraction layer can be tailored to exhibit particular optical properties varying the relative areas of the first and second regions. For example, the second regions can comprise from about 5 to about 60% of an area across a transverse plane of the layer.

In another aspect, this application describes a front-lit reflective display device including the front-lit reflective display assembly optically coupled to a light source.

In yet another aspect, this application describes a front-lit reflective display including the illumination article, light source, and reflective display. Reflective displays include those which do not comprise a backlight. Reflective displays also include those comprising an LCD panel, polymer dispersed liquid crystal display panel, electrophoretic display panel, electrofluidic display, electrowetting display or interferometric display.

The above summary is not intended to describe each disclosed embodiment or every implementation of this disclosure. The figures and the detailed description below more particularly exemplify illustrative embodiments.

BRIEF DESCRIPTION OF DRAWINGS

In the following description, reference is made to the accompanying set of drawings that form a part of this disclosure and in which are shown various general and specific embodiments. It is to be understood that other embodiments are contemplated and may be made without departing from the scope or spirit of the invention. The following detailed description, therefore, is not to be taken in a limiting sense. The figures are schematic drawings and are not necessarily to scale.

FIG. 4b illustrates the refractive index profile for the variable index light extraction layer shown in FIG. 4a.

FIGS. 4c and 4d show profiles for selected optical properties % transmission and % clarity, respectively, for the variable light extraction layer shown in FIG. 4a.

DETAILED DESCRIPTION

In general, the variable index light extraction layer disclosed herein comprises at least two different areas or regions, wherein light of any angle incident upon the layer can be managed differently because the regions have different refractive indices. The variable index light extraction layer can be used in a variety of optical film constructions, assemblies and devices as described herein.

Figure 15A:
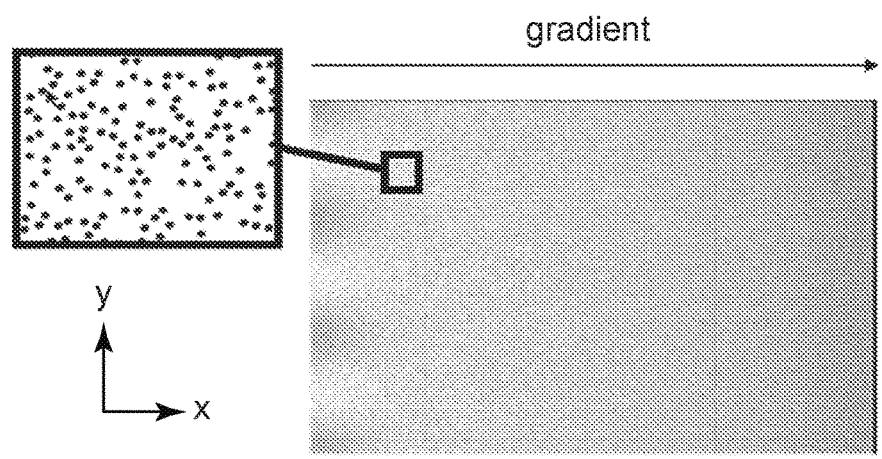
FIG. 15a shows a random gradient dot pattern for an exemplary flexographic tool.
Figure 15B:
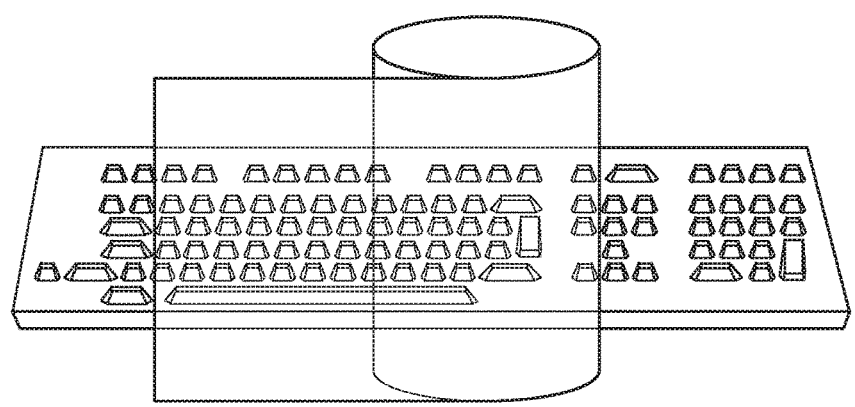
FIG. 15b is a drawing illustrating a roll of an optical film comprising a variable index light extraction layer disposed on a transparent substrate.

The variable index light extraction layer is an optical layer that acts to extract light traveling in an adjacent layer at supercritical angles, while at the same time has little to no light scattering for subcritical angle light incident on the extraction layer. The variable index light extraction layer extracts light from an adjacent layer such as a transparent layer, and can deliver the extracted light to an article or element such that the article or element is illuminated. The variable index light extraction layer does not have features that significantly or functionally scatter light. Thus, when looking through the layer, as shown in FIG. 15b, there is little distortion of images and objects on the opposite side of the layer. Ideally, the materials in first and second regions have different refractive indices, and both are highly transmissive with very low haze. The first and second regions in the variable index light extraction layer can be shaped and arranged to yield a layer with high clarity, low haze and high transmission when the layer is physically attached and optically coupled to a lightguide, reflective scattering element or reflective display.

The variable index light extraction layer allows the lightguide to be transparent exhibiting little to no haze and high clarity with and without illumination. This allows for viewing of images on a reflective display or of a graphic without significant reduction in resolution and contrast, and without visible optical artifacts generated by light scattered or diffracted by different regions. In traditional lightguides, extraction layers have light scattering features in order for light being transported within the lightguide by TIR (at angles equal to or greater than the critical angles) in a lightguide to be directed out of the lightguide. These light scattering features typically comprise diffuse reflective printed extraction dots or structures that are disposed on or are etched into the surface of the lightguide which cause significant reduction in the viewing quality when looking through the lightguide.

In addition to optical benefits, the variable index light extraction layer can be produced by relatively simple coating and printing techniques amenable to high speed, low cost manufacturing.

This disclosure generally relates to polymeric optical films or layers that exhibit regions of high index-like optical properties and low index-like optical properties, or otherwise interact with the transmission, scattering, absorption, refraction or reflection of light. The regions of high index-like optical properties and low index-like optical properties vary across a transverse plane of the optical layer, that is, the optical layer is a variable index optical layer. Throughout this disclosure, the term "index" is often used in place of index of refraction or refractive index. The transverse plane of a variable index light extraction layer disclosed herein can be described as a plane that is parallel to at least one major surface of the layer.

Figure 1A:
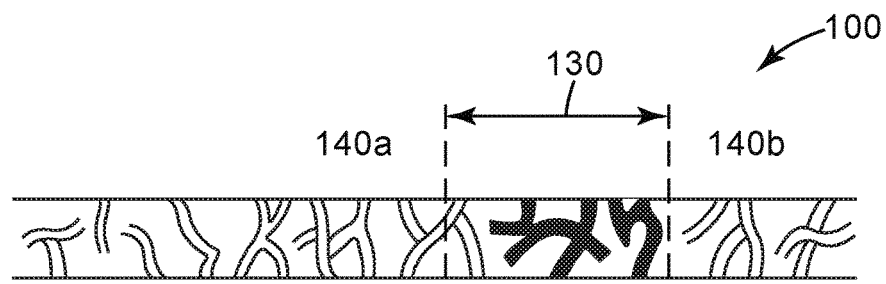
FIG. 1a shows a schematic cross section of an exemplary variable index light extraction layer.

FIG. 1a shows a schematic cross section of an exemplary variable index light extraction layer 100. The extraction layer comprises first regions 140a and 140b, both regions comprising a nanovoided polymeric material. In some embodiments, the nanovoided polymeric material comprises a plurality of interconnected nanovoids as described in WO 2010/120422 A1 (Kolb et al.) and WO 2010/120468 A1 (Kolb et al.). The plurality of interconnected nanovoids is a network of nanovoids dispersed in a binder wherein at least some of the nanovoids are connected to one another via hollow tunnels or hollow tunnel-like passages. Nanovoided polymeric material comprising interconnected nanovoids have nanovoids or pores that can extend to one or more surfaces of the material.

The variable index light extraction layer comprises second region 130 disposed between first regions 140a and 140b. The second region comprises the nanovoided polymeric material and an additional material. In some embodiments, this additional material occupies at least a portion of the void volume of the nanovoided polymeric material. Throughout this disclosure, dashed lines in cross section and plan views are used to indicate general location of the first and second regions, however, these dashed lines are not meant to describe any sort of boundary between the regions.

Figure 1B:
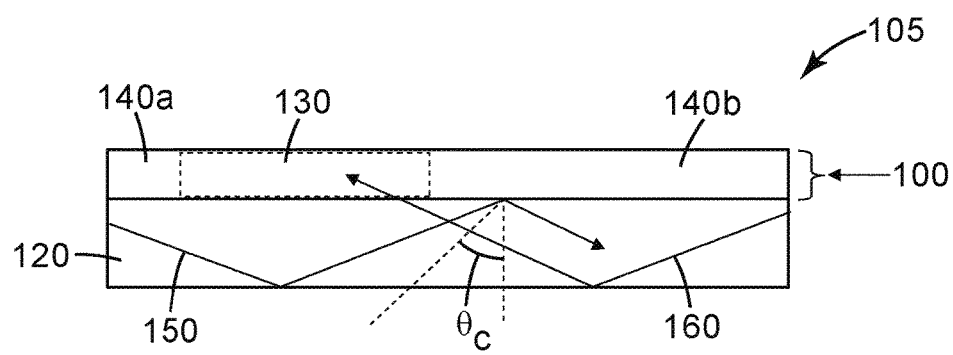
FIGS. 1b-1c show schematic cross sections of an exemplary variable index light extraction layer disposed on a transparent adjacent layer.

FIG. 1b shows a schematic cross section of an exemplary variable index light extraction layer disposed on a transparent adjacent layer. Optical film 105 comprises variable index light extraction layer 100 disposed on adjacent layer 120 which is a transparent substrate. Variable index light extraction layer 100 comprises first regions 140a and 140b, and second region 130 disposed between the first regions.

In general, an area or region is identified by the material it comprises in combination with the refractive index of the region. The first region comprises a nanovoided polymeric material and has a first refractive index. A first region is identified if substantially all of the region comprises the nanovoided polymeric material and if the region has a refractive index within ±0.02 across a continuous transverse plane of the layer. Methods for determining the refractive index across a transverse plane of the layer are described below.

The second region comprises the nanovoided polymeric material and an additional material, and has a second refractive index that is different from the first refractive index by at least about 0.03. The nanovoided polymeric material is the same material in both the first and second regions. A material is considered an additional material if it is incorporated substantially within the variable index light extraction layer and causes a change in refractive index of the first region by at least about 0.03, for example, from about 0.03 to about 0.5, from about 0.05 to about 0.5, or from about 0.05 to about 0.25.

In some embodiments, the additional material is different from the binder used to form the nanovoided polymeric material. In some embodiments, the additional material is the same as the binder used to form the nanovoided polymeric material. A second region is identified if (i) all of the region comprises the nanovoided polymeric material, (ii) the region has a refractive index within ±0.02 across a continuous transverse plane of the variable index light extraction layer, and (iii) the region has a refractive index that is different from that of the first region by at least about 0.03.

In some embodiments, the variable index light extraction layer can be made by combining an additional material with portions of the nanovoided polymeric material that has been formed into some desirable shape such as a layer. Enough of the additional material is combined with the nanovoided polymeric material such that the desired change in refractive index results, and which is at least about 0.03, for example, from about 0.03 to about 0.5, from about 0.05 to about 0.5, or from about 0.05 to about 0.25.

The variable index light extraction layer comprises the first and second regions disposed relative to each other such that for light being transported at supercritical angles in an adjacent layer, the variable index light extraction layer selectively extracts the light in a predetermined way based on the geometric arrangement of the first and second regions. As used herein, supercritical angles are angles that are equal to or greater than the critical angle for a given interface formed by the first region of the variable index light extraction layer and the adjacent layer, is determined by the refractive index difference between the first region and the adjacent layer. The critical angle is the smallest angle of incidence at which a light ray passing from one medium to another less refractive medium can be totally reflected from the boundary between the two.

Referring to FIG. 1b, which is a simplified view of FIG. 1a, light represented by rays 150 and 160 are being transported within adjacent layer 120 by TIR. In this embodiment, the refractive index of first regions 140a and 140b are that much less than that of the adjacent layer which defines critical angle $\theta_c$ as shown. Light traveling at a supercritical angle represented by ray 150 strikes an interface between adjacent layer 120 and first region 140b, and this angle of incidence for ray 150 is greater than $\theta_c$, which results in substantially all of the light being reflected at the interface. Also in this embodiment, the refractive index of second region 130 is approximately equal to or greater than that of adjacent layer 120. In this circumstance there is no critical angle at the interface and the light represented by ray 160 passes through the interface between adjacent layer 120 and second region 130, thus being extracted from the adjacent layer into the second region 130.

Thus, for the embodiment shown in FIG. 1a and FIG. 1b, the first and second regions are disposed relative to each other such that light being transported at supercritical angles in an adjacent layer can be extracted selectively by the variable index light extraction layer in a predetermined way based on the geometric arrangement of the first and second regions.

Figure 1C:
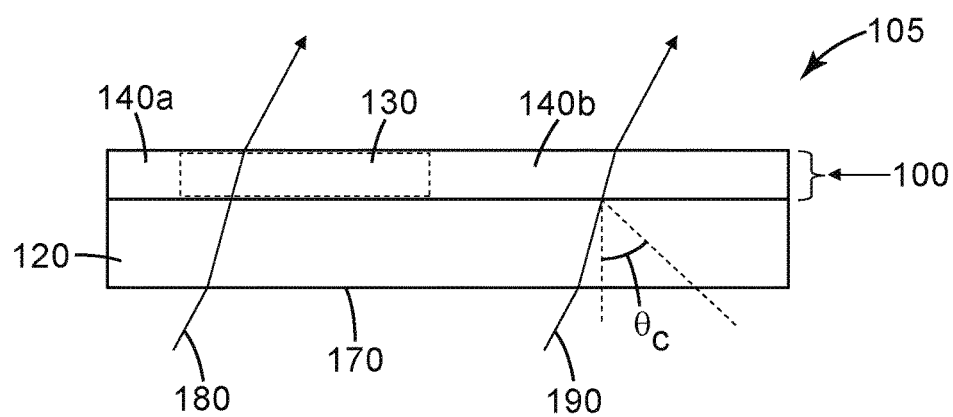

FIG. 1c shows the schematic cross section of optical film 105 with light at subcritical angles impinging on the adjacent layer. Light represented by rays 180 and 190 impinges at subcritical angles on surface 170 of adjacent layer 120, and the light travels essentially undeviated through layers 120 and 100. Light represented by ray 190 travels through first region 140b, and light represented by ray 180 travels through second region 130. There is little to no deviation of light travelling through the different regions of variable index light extraction layer 100. This results in an optical film, such as exemplary optical film 105, that has low haze and high clarity, such that when one looks through the optical film there is little to no distortion of images on the opposite side. The variable index light extraction layer can have any geometric arrangement of first and second regions to produce the desired extracted light pattern.

Figure 2:
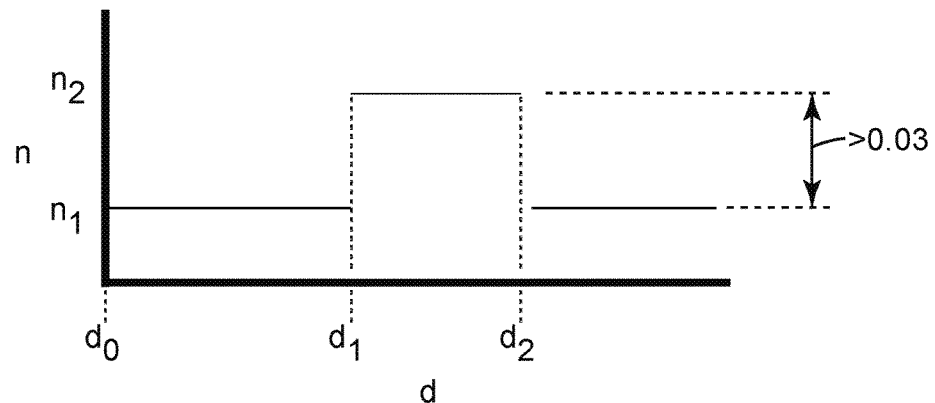
FIG. 2 illustrates the variable index light extraction layer having refractive indices that can vary across a transverse plane of the layer.

In general, the refractive index profile of the variable index light extraction layer may vary in any way, as long as the desired optical performance of the layer is obtained. FIG. 2 illustrates the variable index light extraction layer having refractive indices that can vary across a transverse plane of the layer.

The refractive index profile shows a plot of distance d, which corresponds to a distance across a transverse plane of the layer, for the layer in plan view. FIG. 2 shows that at some initial position on the layer corresponding to $d_0$, the layer has first refractive index $n_1$ corresponding to the first region. Moving across the transverse plane of the layer, first refractive index $n_1$ is observed until reaching $d_1$ where the refractive index of the layer abruptly increases to $n_2$ which corresponds to the second refractive index of the second region. Continuing to move across the transverse plane of the layer, the second refractive index $n_2$ is observed until reaching $d_2$ where the refractive index of the layer abruptly decreases to $n_1$ indicating a second first region.

The change in refractive index between two adjacent first and second regions having low and high indices, respectively, can vary in a number of ways. For example, the change in refractive index can be abrupt, as in a step function, between two adjacent regions. For another example, the change in refractive index can be monotonic, with the refractive index continuously increasing or decreasing (depending on whether the change is observed as a function of moving from the first region to the second region, or the second region to the first region, respectively). In some cases, the first and second refractive indices of the adjacent first and second regions vary as some combination of step and monotonic functions.

The first region of the variable light extraction layer has a refractive index less than that of the second region. For example, the first refractive index may be less than about 1.4, less than about 1.3 or less than about 1.2. The first refractive index may be from about 1.15 to about 1.45, from about 1.2 to about 1.42, from about 1.2 to about 1.40 or from about 1.2 to about 1.35. In general, the particular first and second refractive indices, as well as the particular difference between the two, depends on the desired optical performance of the variable index light extraction layer as described below. The difference in refractive index between the first and second regions is greater about 0.03. In some embodiments, the difference in refractive index between the first and second regions is greater than 0.05, greater than 0.1, greater than 0.2 or greater than 0.25.

The nanovoided polymeric material typically comprises a plurality of interconnected nanovoids or a network of nanovoids dispersed in a binder. At least some of the nanovoids in the plurality or network are connected to one another via hollow tunnels or hollow tunnel-like passages. The nanovoids are not necessarily free of all matter and/or particulates. For example, in some cases, a nanovoid may include one or more small fiber- or string-like objects that include, for example, a binder and/or nano-particles. Some disclosed first regions include multiple pluralities of interconnected nanovoids or multiple networks of nanovoids where the nanovoids in each plurality or network are interconnected. In some cases, in addition to multiple pluralities of interconnected nanovoids, the disclosed first regions may include a fraction of closed or unconnected nanovoids meaning that the nanovoids are not connected to other nanovoids via tunnels.

The nanovoided polymeric material is designed to support TIR by virtue of including a plurality of nanovoids. When light that travels in an optically transparent (clear and non-porous) adjacent layer and that light is incident on a stratum possessing high porosity, the reflectivity of the incident light is much higher at oblique angles than at normal incidence. In the case of nanovoided first regions having little to no haze, the reflectivity at oblique angles greater than the critical angle is close to about 100%. In such cases, the incident light undergoes TIR.

The nanovoids in the disclosed first region have an index of refraction $n_v$ and a permittivity $\varepsilon_v$, where $n_v^2 = \varepsilon_v$, and the binder has an index of refraction $n_b$ and a permittivity $\varepsilon_b$, where $n_b^2 = \varepsilon_b$. In general, the interaction of a layer of nanovoided polymeric material with light, such as light that is incident on, or propagates in, the layer, depends on a number of characteristics of the layer such as, for example, the layer thickness, the binder index, the nanovoid or pore index, the pore shape and size, the spatial distribution of the pores, and the wavelength of light. In some cases, light that is incident on or propagates within the layer of nanovoided polymeric material "sees" or "experiences" an effective permittivity $\varepsilon_{eff}$ and an effective index $n_{eff}$, where $n_{eff}$ can be expressed in terms of the nanovoid index $n_v$, the binder index $n_b$, and the nanovoid porosity or volume fraction "f". In such cases, the layer is sufficiently thick and the nanovoids are sufficiently small so that light cannot resolve the shape and features of a single or isolated nanovoid. In such cases, the size of at least a majority of the nanovoids, such as at least 60% or 70% or 80% or 90% of the nanovoids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some embodiments, light that is incident on a disclosed first region of the variable light extraction layer is visible light which can be in a range of from about 380 nm to about 750 nm, or from about 400 nm to about 700 nm, or from about 420 nm to about 680 nm. In such cases, the first region of the variable light extraction layer has an effective index of refraction and includes a plurality of nanovoids if the size of at least a majority of the nanovoids, such as at least 60% or 70% or 80% or 90% of the nanovoids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed first region of the variable index light extraction layer is sufficiently thick so that the region can reasonably have an effective index that can be expressed in terms of the indices of refraction of the nanovoids and the binder, and the nanovoid or pore volume fraction or porosity. In such cases, the thickness of the first region is not less than about 100 nm, or not less than about 200 nm, or not less than about 500 nm, or not less than about 700 nm, or not less than about 1,000 nm.

When the nanovoids in a disclosed first region are sufficiently small and the region is sufficiently thick, the first region has an effective permittivity $\varepsilon_{eff}$ that can be expressed as:

$$\varepsilon_{eff} = f\varepsilon_v + (1-f)\varepsilon_b \quad (1)$$

In such cases, the effective index $n_{eff}$ of the first region can be expressed as:

$$n_{eff}^2 = fn_v^2 + (1-f)n_b^2 \quad (2)$$

In some cases, such as when the difference between the indices of refraction of the pores and the binder is sufficiently small, the effective index of the first region can be approximated by the following expression:

$$n_{eff} = fn_v + (1-f)n_b \quad (3)$$

In such cases, the effective index of the first region is the volume weighted average of the indices of refraction of the nanovoids and the binder. For example, a first region that has a void volume fraction of about 50% and a binder that has an index of refraction of about 1.5, has an effective index of about 1.25.

Figure 3:
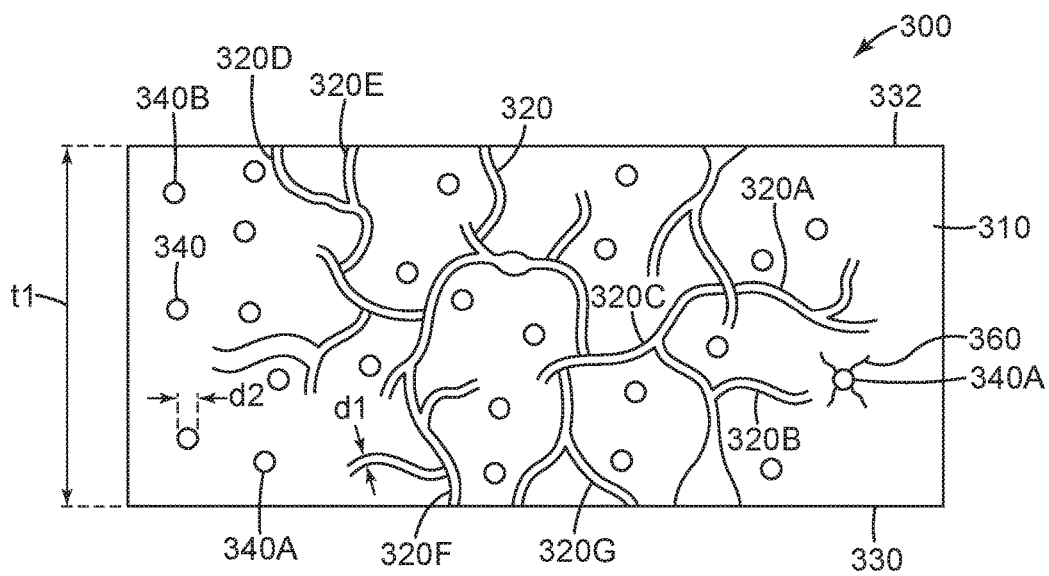
FIG. 3 is a schematic cross-sectional view of a first region of the variable index light extraction layer.

FIG. 3 is a schematic cross-sectional view of a first region of the variable index light extraction layer that includes a network of nanovoids or plurality of interconnected nanovoids and a plurality of particles dispersed substantially uniformly within a binder. First region 300 comprises plurality of interconnected nanovoids 320 dispersed in binder 310. Nanovoids 320 includes interconnected nanovoids 320A-320C. First and second major surfaces 330 and 332, respectively, are porous as indicated by surface pores 320D-G which may or may not provide a tunnel that extends from one surface to another or through the thickness of the region. Some of the nanovoids, such as nanovoids 320B and 320C, are within the interior of the first region and may or may not tunnel to a surface.

Voids 320 have a size $d_1$ that can generally be controlled by choosing suitable composition and fabrication, such as coating, drying and curing conditions. In general, $d_1$ can be any desired value in any desired range of values. For example, in some cases, at least a majority of the nanovoids, such as at least 60% or 70% or 80% or 90% or 95% of the nanovoids, have a size that is in a desired range. For example, in some cases, at least a majority of the nanovoids, such as at least 60% or 70% or 80% or 90% or 95% of the nanovoids, have a size that is not greater than about 500 nm, not greater than 400 nm, not greater than about 300 nm, not greater than about 200 nm, not greater than about 100 nm, not greater than about 70 nm, or not greater than about 50 nm. In some cases, some of the nanovoids can be sufficiently small such that the refractive index of the region is changed, with little or no scattering of light.

Binder 310 can comprise any material such as a polymer. The binder may be a polymer formed from a polymerizable composition comprising monomers, wherein the monomers are cured using actinic radiation, e.g., visible light, ultraviolet radiation, electron beam radiation, heat and combinations thereof, or any of a variety of conventional anionic, cationic, free radical or other polymerization techniques, which can be chemically or thermally initiated. Polymerization may be carried out using solvent polymerization, emulsion polymerization, suspension polymerization, bulk polymerization, and the like. Useful monomers include small molecules having a molecular weight less than about 500 g/mole, oligomers having a molecular weight of greater than 500 to about 10,000 g/mole, and polymers having a molecular weight of greater than 10,000 to about 100,000 g/mole.

Representative examples of curable groups suitable in the practice of the present disclosure include epoxy groups, ethylenically unsaturated groups, olefinic carbon-carbon double bonds, allyloxy groups, (meth)acrylate groups, (meth)acrylamide groups, cyanoester groups, vinyl ethers groups, combinations of these, and the like. The monomers may be mono- or multifunctional and capable of forming a crosslinked network upon polymerization. As used herein, (meth)acrylate refers to acrylate and methacrylate, and (meth)acrylamide refers to acrylamide and methacrylamide.

Useful monomers include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, iso-octyl (meth)acrylate, nonylphenol ethoxylate (meth)acrylate, isononyl (meth) acrylate, diethylene glycol (meth)acrylate, isobornyl (meth) acrylate, 2-(2-ethoxyethoxy)ethyl (meth)acrylate, 2-ethylhexyl (meth)acrylate, lauryl (meth)acrylate, butanediol mono(meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth) acrylate, dodecyl (meth)acrylate, n-butyl (meth)acrylate, methyl (meth) acrylate, hexyl (meth)acrylate, (meth)acrylic acid, N-vinylcaprolactam, stearyl (meth)acrylate, hydroxyl functional polycaprolactone ester (meth) acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Functional oligomers and polymers may also be collectively referred to herein as "higher molecular weight constituents or species." Suitable higher molecular weight constituents may be incorporated into compositions of the present disclosure. Such higher molecular weight constituents may provide benefits including viscosity control, reduced shrinkage upon curing, durability, flexibility, adhesion to porous and nonporous substrates, outdoor weatherability, and/or the like. The amount of oligomers and/or polymers incorporated into fluid compositions of the present disclosure may vary within a wide range depending upon such factors as the intended use of the resultant composition, the nature of the reactive diluent, the nature and weight average molecular weight of the oligomers and/or polymers, and the like. The oligomers and/or polymers themselves may be straight-chained, branched, and/or cyclic. Branched oligomers and/or polymers tend to have lower viscosity than straight-chain counterparts of comparable molecular weight.

Exemplary polymerizable oligomers or polymers include aliphatic polyurethanes, acrylics, polyesters, polyimides, polyamides, epoxy polymers, polystyrene (including copolymers of styrene) and substituted styrenes, silicone containing polymers, fluorinated polymers, combinations of these, and the like. For some applications, polyurethane and acrylate oligomers and/or polymers can have improved durability and weatherability characteristics. Such materials also tend to be readily soluble in reactive diluents formed from radiation curable, (meth)acrylate functional monomers.

Because aromatic constituents of oligomers and/or polymers generally tend to have poor weatherability and/or poor resistance to sunlight, aromatic constituents can be limited to less than 5 weight percent, preferably less than 1 weight percent, and can be substantially excluded from the oligomers and/or polymers and the reactive diluents of the present disclosure. Accordingly, straight-chained, branched and/or cyclic aliphatic and/or heterocyclic ingredients are preferred for forming oligomers and/or polymers to be used in outdoor applications.

Suitable radiation curable oligomers and/or polymers for use in the present disclosure include, but are not limited to, (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Materials useful for toughening the nanovoided layer 300 include resins with high tensile strength and high elongation, for example, CN9893, CN902, CN9001, CN961, and CN964 that are commercially available from Sartomer Company; and EBECRYL 4833 and Eb8804 that are commercially available Cytec. Suitable toughening materials also include combinations of "hard" oligomeric acrylates and "soft" oligomeric acrylates. Examples of "hard" acrylates include polyurethane acrylates such as EBECRYL 4866, polyester acrylates such as EBECRYL 838, and epoxy acrylates such as EBECRYL 600, EBECRYL 3200, and EBECRYL 1608 (commercially available from Cytec); and CN2920, CN2261, and CN9013 (commercially available from Sartomer Company). Examples of the "soft" acrylates include EBECRYL 8411 that is commercially available from Cytec; and CN959, CN9782, and CN973 that are commercially available from Sartomer Company. These materials are effective at toughening the nanovoided structured layer when added to the coating formulation in the range of 5-25% by weight of total solids (excluding the solvent fraction).

The nanovoided polymeric material may or may not contain particles. Particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 um, or not greater than about 3 um, or not greater than about 2 um, or not greater than about 1 micron, or not greater than about 700 nm, or not greater than about 500 nm, or not greater than about 200 nm, or not greater than about 100 nm, or not greater than about 50 nm.

In some cases, particles 340 have an average particle size that is not greater than about 5 um, not greater than about 3 um, not greater than about 2 um, not greater than about 1 um, not greater than about 700 nm, not greater than about 500 nm, not greater than about 200 nm, not greater than about 100 nm, or not greater than about 50 nm. In some cases, some of the particles can be sufficiently small such that the refractive index of the region is changed, with little or no scattering of light.

In some cases, $d_1$ and/or $d_2$ are sufficiently small such that the refractive index of the region is changed, with little or no scattering of light. In such cases, for example, $d_1$ and/or $d_2$ are not greater than about $\lambda/5$, not greater than about $\lambda/6$, not greater than about $\lambda/8$, not greater than about $\lambda/10$, not greater than about $\lambda/20$, where $\lambda$ is the wavelength of light. As another example, in such cases, $d_1$ and $d_2$ are not greater than about 70 nm, not greater than about 60 nm, not greater than about 50 nm, not greater than about 40 nm, not greater than about 30 nm, not greater than about 20 nm, or not greater than about 10 nm.

Other properties of particles used in the nanovoided polymeric layer include shape. The particles can have a regular shape such as spherical, or an irregular shape. The particles can be elongated having an average aspect ratio that is not less than about 1.5, not less than about 2, not less than about 3, not less than about 4, or not less than about 5. In some cases, the particles can be in the form or shape of a string-of-pearls (such as SNOWTEX-PS particles available from Nissan Chemical) or aggregated chains of spherical or amorphous particles, such as fumed silica.

The nanoparticles can be inorganic or organic, or a combination thereof. In some embodiments, the nanoparticles can be porous particles, hollow particles, solid particles, or a combination thereof. Examples of suitable inorganic nanoparticles include silica and metal oxides such as zirconia, titania, ceria, alumina, iron oxide, vanadia, antimony oxide, tin oxide, alumina/silica, silica/zirconia and combinations thereof. The nanoparticles can be surface-modified such that they bond to the binder chemically and/or physically. In the former case, the surface-modified nanoparticles have functionality that chemically reacts with the binder. In general, surface modification is well known and can be carried out with conventional materials and techniques as described in the references cited above.

The weight ratio of binder to nanoparticles can range from about 30:70, 40:60, 50:50, 55:45, 60:40, 70:30, 80:20 or 90:10 or more depending on the desired properties of the nanovoided polymeric layer. The preferred ranges of wt % of nanoparticles range from about 10% by weight to about 60% by weight, and can depend on the density and size of the nanoparticle used.

In cases where the primary optical effect of network of voids 320 and particles 340 is to affect the effective index and to minimize scattered light, the optical haze of optical layer 300 that is due to voids 320 and particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the optical layer is not greater than about 1.40, or not greater than about 1.35, or not greater than about 1.3, or not greater than about 1.25, or not greater than about 1.2, or not greater than about 1.15.

First region 300 can have other materials in addition to binder 310 and particles 340. For example, first region 300 can include one or more additives, such as for example, coupling agents, to help wet the surface of a substrate, not expressly shown in FIG. 3, on which the nanovoided polymeric material is formed. Other exemplary materials in first region 300 include initiators, such as one or more photo-initiators, anti-stats, UV absorbers and release agents.

The nanovoided polymeric material is typically formed as a layer. Methods for making a layer of the nanovoided polymeric material are described in the Kolb et al. references cited above. In one process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. In some cases, after the polymerization step, the solvent may still include some of the polymerizable material, although at a lower concentration. Next, the solvent is removed by drying or evaporating the solution resulting in first region 300 that includes a network, or a plurality, of voids 320 dispersed in polymer binder 310. The first region further includes plurality of particles 340 dispersed in the polymer. The particles are bound to the binder, where the bonding can be physical or chemical.

In general, a nanovoided polymeric layer can be formed with a desired porosity or void volume, which can depend on the desired properties of the first region of the variable index light extraction layer. For example, the first region may have a void volume of about 20 to about 70%, about 30 to about 70% or about 40 to about 70%. In some cases, the void volume is not less than about 20%, not less than about 30%, not less than about 40%, not less than about 50%, not less than about 60%, not less than about 70%, not less than about 80%, or not less than about 90%.

In some embodiments, first region 300 has a low optical haze. In such cases, the optical haze of the optical layer is not greater than about 10%. Or not greater than about 7%, or not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. The haze variation across the first region can be in the range of from about 1-5%, of from about 1-3%, of from about 1-2%, or less than 1%. In such cases, the optical film can have a reduced effective index that is not greater than about 1.40, or not greater than about 1.35, or not greater than about 1.3, or not greater than about 1.2, or not greater than about 1.15, or not greater than about 1.1, or not greater than about 1.05. For light normally incident on optical layer 300, optical haze, as used herein, is defined as the ratio of the transmitted light that deviates from the normal direction by more than 4 degrees to the total transmitted light. Haze values disclosed herein were measured using a Haze-Gard Plus haze meter (BYK-Gardiner, Silver Springs, Md.) according to the procedure described in ASTM D1003.

In some embodiments, first region 300 has a high optical clarity. For light normally incident on first region 300, optical clarity, as used herein, refers to the ratio $(T_1-T_2)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardiner. In the cases where first region 300 has a high optical clarity, the clarity is not less than about 80%, or not less than about 85%, or not less than about 90%, or not less than about 95%.

The nanovoided polymeric material of the first region 300, can be made by coating the solvent containing solution described above onto a substrate. In many cases the substrate can be formed of any polymeric material useful in a roll to roll process. In some embodiments the substrate layer is transparent with little to no haze and high clarity and is formed of polymers such as polyethylene terephthalate (PET), polycarbonates, acrylics, and cycloolefin polymers. The substrate may also comprise transparent substrates such as glass and other transparent inorganic materials. The substrate may also comprise reflective scattering substrates or materials such as diffuse white polymeric substrates, semispecular substrates polymeric substrates such as multilayer optical films (for example ESR available from 3M), metallic semispecular reflectors for example brushed aluminum. In some cases the substrate may comprise a release liner such that the nanovoided polymeric layer 300 may be transferred to another substrate for example to an adhesive layer.

For embodiments in which the first region comprises nanovoided polymeric material, the additional material defines the second region. The additional material resides within the nanovoids of the nanovoided polymeric material and has a refractive index high enough such that the refractive index of the second region is greater than that of the first region. Useful additional materials include any material that can be incorporated within the nanovoided polymeric material such that the variable index light extraction layer can function as desired. The additional material has a high refractive index in the sense that it can increase the refractive index of the nanovoided polymeric material, i.e., can increase the first refractive index by at least about 0.03, for example, from about 0.03 to about 0.5, from about 0.05 to about 0.5, or from about 0.05 to about 0.25.

In general, the additional material can have a refractive index in a range of from about 1.40 to 2.1. The exact range of refractive indices for the additional material will depend on the refractive index the nanovoided polymeric material and also the refractive index of an adjacent layer from which the extraction layer is extracting light. For the purposes of the invention described herein, the variable index light extraction layer is designed to extract light from an adjacent transparent layer. In order to perform this function the first region of the variable index light extraction layer must have a refractive index less than that of the adjacent transparent layer, and the second region of the variable index light extraction layer has a refractive index approximately equal to or greater than that of the adjacent transparent layer from which the light is being extracted.

In general, the additional material is incorporated into the nanovoided polymeric material with little or no additional material on a surface of the nanovoided polymeric material. In some embodiments, the additional material substantially completely fills the interconnected nanovoids such that little or no void volume (less than 5% void volume) remains within the second region. In some embodiments, the additional material partially fills the interconnected nanovoids such that some void volume remains. The second regions comprise a particular amount of void volume depending upon the refractive index of the additional material and the desired difference in refractive indices between the first and second regions. For example, the second region may have a void volume less than about 20%, less than about 10%, less than about 5% or less than about 1%.

Exemplary additional materials include small molecules, oligomers and polymers. Any of the materials described above for making the nanovoided polymeric material may be used as the additional material. Generally, the additional material is deposited into voids of the nanovoided nanovoided polymeric material, using methods such as printing which are described below. In some cases, the additional material is a polymerizable material that is 100% solids and has a viscosity that under the conditions of application allows the additional material to penetrate the nanovoided polymeric material thus forming the second region.

The particular choice of additional material may depend on the method by which it is incorporated into the nanovoided polymeric layer. Various methods are described below. For example, in some embodiments, the variable index light extraction layer is made by depositing the additional material on selected areas or regions of a surface of a layer comprising the nanovoided polymeric material. The additional material then penetrates the nanovoided polymeric material such that little or no additional material remains on a surface of the layer. This embodiment may require an additional material having a low enough viscosity and molecular constituents with sizes that are small enough to penetrate into and through the nanovoids of the nanovoided polymeric material.

In some embodiments, the variable index light extraction layer is made by depositing a polymerizable composition on selected areas or regions of a surface of a layer comprising the nanovoided polymeric material. The polymerizable composition then penetrates the nanovoided material such that little or no polymerizable composition remains on a surface of the layer. The polymerizable composition can then be polymerized by conventional means to form the additional material, thus forming the second region having both the first material and the additional material. In some cases the additional material penetrates completely through the thickness of the layer of the nanovoided polymeric material.

The first and second regions may be disposed relative to each other, across a transverse plane of the variable index light extraction layer, in order to manage light in a desired way. For example, the second region may comprise a plurality of second regions arranged in a pattern across a transverse plane of the layer. For another example, the second region may comprise a plurality of second regions arranged randomly across a transverse plane of the layer. Either the first or second region may be a continuous region across a transverse plane of the layer. For a first or second region that is discontinuous, i.e., is a plurality of regions, the density can vary in any direction across a transverse plane of the layer. For example, the density of second regions can vary in one or two dimensions across a transverse plane of the layer. Several of these embodiments are described in FIGS. 4a-4d, 5a and 5b.

The optimal thickness of the variable index light extraction layer is determined by the function that the layer is designed to perform. The layer thickness depends on the nature of the nanovoided polymeric material. The variable index light extraction layer should be thick enough such that the first region can provide optical isolation of an adjacent transparent substrate, in which supercritical light is propagating, from another layer which is disposed on an opposing side of the variable index light extraction layer. The thickness of the nanovoided polymeric layer should be thin enough such that the additional material can be deposited onto the layer and penetrate substantially into the layer, and is some cases through the thickness of the layer, thus creating the second region. In some cases the variable index light extraction layer has a thickness greater than about 500 nm, or in the range of from about 500 nm to about 100 um, from about 500 nm to about 8 um, from about 1 micron to about 5 um, or from about 1 um to about 3 um.

The variable index light extraction layer supports or promotes TIR, and so the layer is sufficiently thick so that the evanescent tail of a light ray that undergoes TIR at a surface of the variable index light extraction layer does not optically couple, or optically couples very little, across the thickness of the layer. In such cases, the thickness of the variable index light extraction layer is not less than about 0.5 um, not less than about 1 um, not less than about 1.1 um, not less than about 1.2 um, not less than about 1.3 um, not less than about 1.4 um, not less than about 1.5 um, not less than about 1.7 um, or not less than about 2 um. A sufficiently thick variable index light extraction layer can prevent or reduce an undesired optical coupling of the evanescent tail of an optical mode across the thickness of the layer.

In some cases, the variable index light extraction layer has low optical haze measured as a bulk property of the layer. In such cases, the optical haze of the variable index light extraction layer is not greater than about 10%, not greater than about 7%, not greater than about 5%, not greater than about 4%, not greater than about 3.5%, not greater than about 4%, not greater than about 3%, not greater than about 2.5%, not greater than about 2%, not greater than about 1.5%, or not greater than about 1%. In such cases, the variable index light extraction layer can have a reduced effective index that is not greater than about 1.40, not greater than about 1.35, not greater than about 1.3, not greater than about 1.2, not greater than about 1.15, not greater than about 1.1, or not greater than about 1.05. Optical haze, as used herein, is defined for normally incident light on the surface of a given layer, as the ratio of the transmitted light that deviates from the normal direction by more than 4 degrees to the total transmitted light. Haze values disclosed herein were measured using a Haze-Gard Plus haze meter (BYK-Gardiner, Silver Springs, Md.) according to the procedure described in ASTM D1003.

In some cases, the variable index light extraction layer has high optical clarity. Optical clarity, as used herein, is defined for light normally incident on the layer and refers to the ratio $(T_1-T_2)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardiner. In cases where variable index light extraction layer has high optical clarity, the clarity is not less than about 80%, not less than about 85%, not less than about 90%, or not less than about 95%.

Figure 4A:
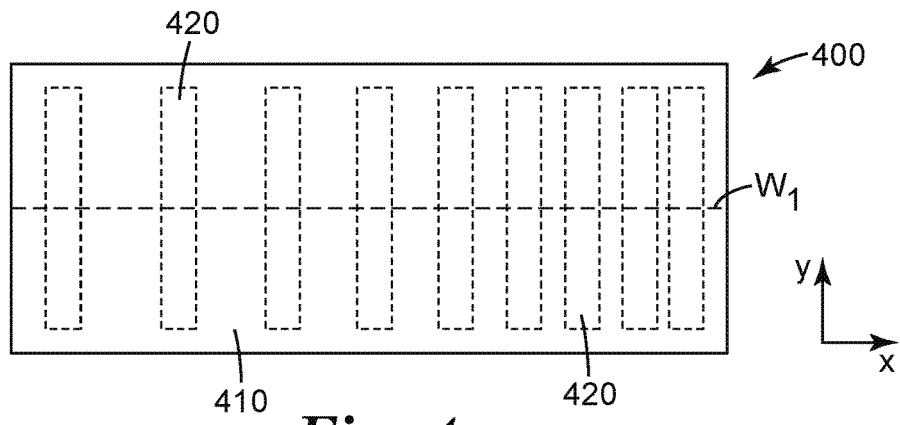
FIG. 4a is a plan view of a variable index light extraction layer showing an exemplary geometric arrangement of the first and second regions.

The variable index light extraction layer can comprise the first and second regions disposed relative to each other, in some desired geometric arrangement across a transverse plane of the layer, so that the layer provides desired optical performance features. FIG. 4a is a plan view of a variable index light extraction layer showing an exemplary geometric arrangement of the first and second regions. Variable index light extraction layer 400 comprises first region 410 that is continuous across the layer as seen in plan view of the layer, and second regions 420 are discreet regions enclosed by the rectangles illustrated using dashed lines.

As stated above, dashed lines are used throughout this disclosure to indicate general location of the first and second regions, however, these dashed lines are not meant to describe any sort of boundary between the regions. As described herein, the second regions are formed by depositing additional material on nanovoided polymeric material, typically by some printing means, such that the penetration, wicking, etc. of the additional material into the nanovoided polymeric material is dependent on the chemistry of the materials used to form the regions as well as properties such as viscosity, wetting, temperature and so forth.

Figure 4B:
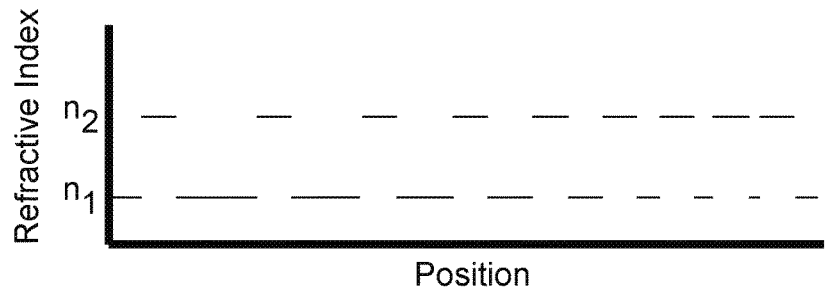
Figure 4C:
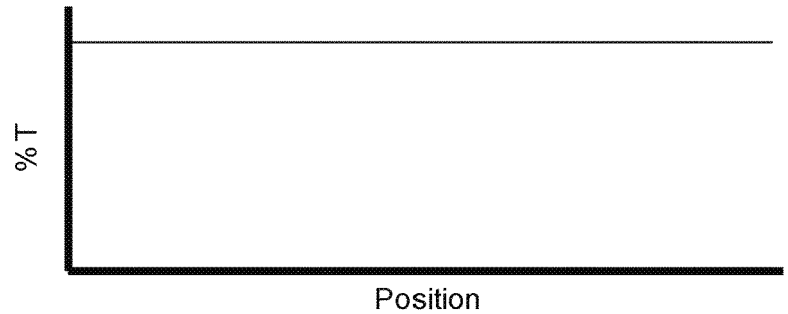
Figure 4D:
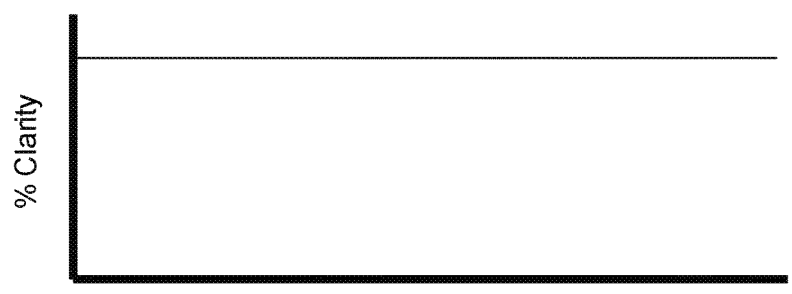

Second regions 420 are shaped as rectangles or stripes of substantially the same length and width, extending across the width of layer 400, and disposed from left to right with increasing frequency. Second regions 420 have a refractive index greater than that of first region 410 by at least about 0.03. FIG. 4b illustrates the refractive index profile for variable index light extraction layer 400 with the x-axis identifying positions d down the length of the layer at some substantially single position $w_1$ as shown in FIG. 4a. The refractive index profile shows the variation in the refractive index of layer 400 which comprises a pattern between first and second refractive indices, $n_1$ and $n_2$, respectively. FIGS. 4c and 4d show profiles for selected optical properties % transmission and % clarity, respectively, and for both properties, there is substantially little or no variation down the length of the layer.

Figure 5A:
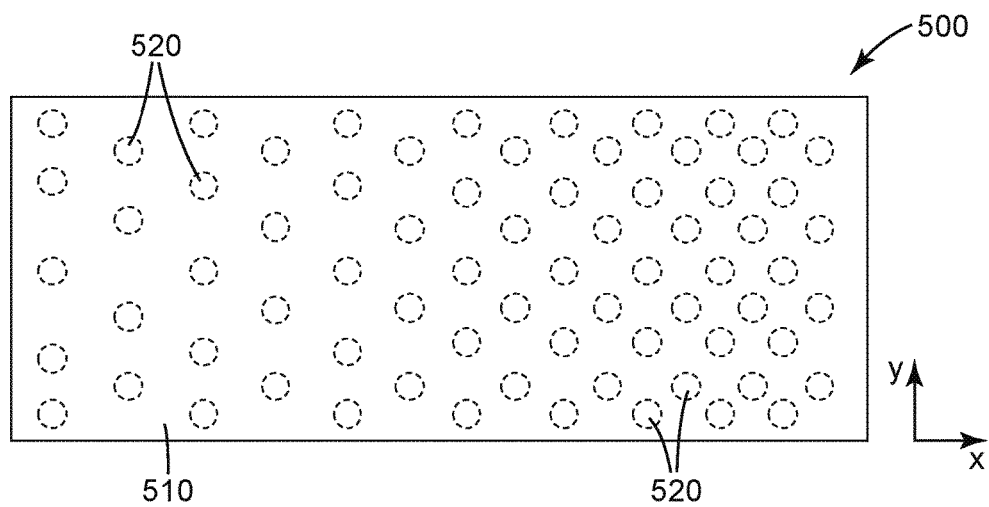
FIGS. 5a and 5b show plan views of variable index light extraction layers showing exemplary geometric arrangements of the first and second regions.

FIG. 5a shows a plan view of another variable index light extraction layer showing an exemplary geometric arrangement of the first and second regions. Variable index light extraction layer 500 comprises first region 510 that is continuous across the layer as seen in plan view of the layer, and second regions 520 are discreet regions enclosed by the circles illustrated using dashed lines. The pattern also shows that the density of the second regions 520 can vary in both the x and y dimensions.

Figure 5B:
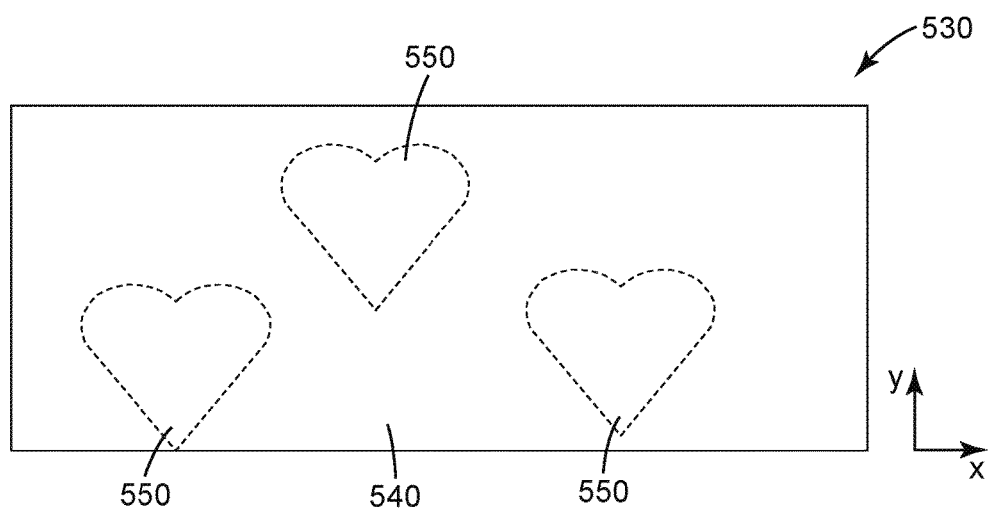

FIG. 5b shows a plan view of another variable index light extraction layer showing an exemplary geometric arrangement of the first and second regions. Variable index light extraction layer 530 comprises first region 540 that is continuous across the layer as seen in plan view of the layer, and second regions 550 are discreet regions enclosed by the shapes, in this case hearts, as illustrated using dashed lines. The pattern shows that the geometric arrangement of high index regions, do not have to vary in a gradient fashion, but that they may also be patterned to provide image-wise extraction of supercritical light from an adjacent transparent layer.

The geometric arrangement of the first and second regions of the variable light extraction layer is designed to extract supercritical light propagating in an adjacent transparent layer and deliver that light to another layer on the opposing side of the variable index light extraction layer in a predetermined pattern, for example substantially uniform illumination.

The variable index light extraction layer may be disposed on a substrate. The substrate may comprise a support used to manufacture the layer as described in PCT Application No. US2011/021053 (Wolk et al.). In some embodiments, an optical film includes the variable index light extraction layer disposed on a transparent substrate. As used herein, "transparent" means substantially optically clear and substantially low haze and non-scattering. Exemplary transparent substrates have requisite optical properties depending on desired properties of the optical film. The transparent substrate may comprise a polymeric substrate such as a polyester, poly(meth)acrylate, polycarbonate and the like. In some embodiments, the transparent substrate comprises a lightguide as described below. In some embodiments, the transparent substrate has some level of haze and can provide some light scattering such that light can be scattered in a forward direction toward reflective scattering element layer 650.

Figure 6:
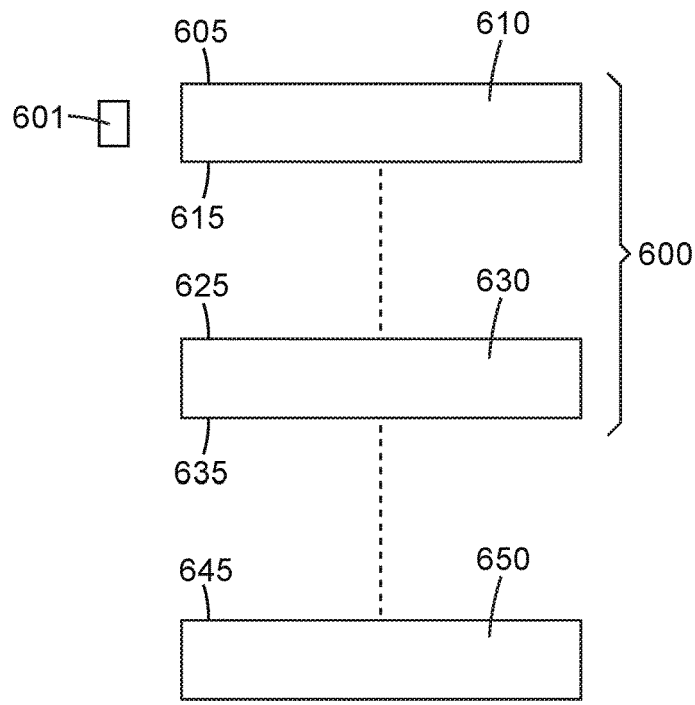
FIG. 6 shows a schematic of an exemplary illumination device comprising the variable index light extraction layer in combination with a light source and a reflective scattering element.

FIG. 6 shows a schematic of exemplary illumination device 600 comprising the variable index light extraction layer in combination with a reflective scattering element which is illuminated by the device. Illumination device 600 comprises lightguide 610 disposed adjacent to variable light extraction layer 630. The lightguide is optically coupled to the top surface 625 of the variable index light extraction layer 630 (denoted by the dashed line between the two surfaces). Adjacent opposing surface 635 of the variable index light extraction layer is reflective scattering element 650 shown in the form of a layer for simplicity. The reflective scattering element is optically coupled to the bottom surface of the variable index light extraction layer 635 (denoted by the dashed line between the two surfaces). Light source 601 is optically coupled to lightguide 610 such that light emitted by the light source can enter the lightguide. In some embodiments, there are no air gaps between the bottom surface 615 of lightguide 610 and the top surface 625 of the variable index light extraction layer 630 and there are no air gaps between the bottom surface 635 of the variable index light extraction layer 630 and the reflective scattering element 650 in order for optical coupling to occur.

In some embodiments, lightguide 610 has a refractive index between those of the first and second regions of the variable index light extraction layer.

According to this embodiment, a method of providing light comprises: providing a light source, lightguide and an optical film comprising the variable index light extraction layer; and optically coupling the light source to the lightguide and the lightguide to the variable index light extraction layer, such that light emitted by the light source is transported within the lightguide by total internal reflection and selectively extracted from the lightguide by the variable index light extraction layer.

In some embodiments, variable light extraction layer 630 can be disposed directly on surface 645 of reflective scattering element 650. Lightguide 610 can be directly attached to surface 625 of the variable light extraction layer by several methods. As described below, lightguide 610 can comprise a thermoplastic resin material, for example, an acrylic, and in these cases, the lightguide can be formed by either casting molten resin onto surface 625 of the variable index extraction layer, or it can be attached to the variable index extraction layer by an insert injection molding process. In some cases lightguide 610 comprises an elastomeric material such that it can be heat laminated to surface 625 of the variable index extraction layer. In some cases lightguide 610 comprises a pressure sensitive adhesive (PSA) such that it can be directly laminated to surface 625 of the variable index extraction layer. In cases where lightguide 610 is not an adhesive, surface 625 of the variable index light extraction layer can be adhered to surface 615 of the lightguide using an optically clear adhesive. Optically clear adhesives are described below.

Lightguide 610 may include any suitable material or materials. For example, the lightguide may include glass, acrylates, including polymethylmethacrylate, polycarbonate, polystryrene, styrene methacrylate copolymers and blends, cycloolefin polymers (e.g. ZEONEX and ZEONOR available from ZEON Chemicals L.P., Louisville, Ky.), fluoropolymers, polyesters including polyethylene terephthalate (PET), polyethylene naphthalate (PEN), and copolymers containing PET or PEN or both; polyurethanes, epoxies, polyolefins including polyethylene, polypropylene, polynorbornene, polyolefins in isotactic, atactic, and syndiotactic strereoisomers, and polyolefinss produced by metallocene polymerization. In some cases, the lightguide can be elastomeric such as elastomeric polyurethanes materials and silicone based polymers, including but not limited to, polydialkylsiloxanes, silicone polyureas, and silicone polyoxamides.

In some embodiments, the lightguide is a viscoelastic lightguide as described in WO 2010/005655 A2 (Sherman et al.). In general, the viscoelastic lightguide comprises one or more viscoelastic materials which exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic lightguide may have properties that facilitate sufficient contact or wetting with at least a portion of a material designed to extract light from the lightguide, e.g., an optical article, such that the viscoelastic lightguide and the optical article are optically coupled. Light can then be extracted from the viscoelastic lightguide. The viscoelastic lightguide is generally soft, compliant and flexible. Thus, the viscoelastic lightguide may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer. Useful viscoelastic materials may have a storage modulus, G', of less than about 300,000 Pa, measured at 10 rad/sec and a temperature of from about 20 to about 22° C. Viscoelastic properties of materials can be measured using Dynamic Mechanical Analysis according to, for example, ASTM D4065, D4440, and D5279.

In some embodiments, the viscoelastic lightguide comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic lightguide may have a particular peel force or at least exhibit a peel force within a particular range. For example, the viscoelastic lightguide may have a 90° peel force of from about 50 to about 3000 g/in, from about 300 to about 3000 g/in, or from about 500 to about 3000 g/in. Peel force may be measured using a peel tester from IMASS.

In some embodiments, the viscoelastic lightguide comprises an optically clear lightguide having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic lightguide has a haze value of less than about 5%, less than about 3%, or less than about 1%. In some embodiments, the viscoelastic lightguide has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic lightguide comprises an optically clear lightguide having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic lightguide may also have a light transmittance of from about 50 to about 100%.

The viscoelastic lightguide may have a refractive index in the range of from about 1.3 to about 2.6, 1.4 to about 1.7, or from about 1.5 to about 1.7. The particular refractive index or range of refractive indices selected for the viscoelastic lightguide may depend on the overall design of the illumination device and the particular application in which the device may be used.

The viscoelastic lightguide material may comprise nanoparticles that can modify the refractive index of the viscoelastic lightguide material or to affect the mechanical properties of the viscoelastic lightguide material. Suitable nanoparticles have sizes such that the particles produce the desired effect without introducing significant amount of scattering into lightguide material.

The viscoelastic lightguide generally comprises at least one polymer. The viscoelastic lightguide may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs are described in detailed in the Sherman et al. references cited above. Useful PSAs include poly(meth) acrylate PSAs derived from: monomer A comprising at least one monoethylenically unsaturated alkyl (meth)acrylate monomer, wherein a homopolymer of the monomer has a Tg of no greater than about 0° C.; and monomer B comprising at least one monoethylenically unsaturated free-radically copolymerizable reinforcing monomer, wherein a homopolymer of the monomer has a Tg higher than that of monomer A, for example, at least about 10° C. As used herein, (meth)acrylic refers to both acrylic and methacrylic species and likewise for (meth)acrylate.

In some embodiments, the viscoelastic lightguide comprises natural rubber-based and synthetic rubber-based PSAs, thermoplastic elastomers, tackified thermoplastic-epoxy derivatives, polyurethane derivatives, polyurethane acrylate derivatives, silicone PSAs such as polydiorganosiloxanes, polydiorganosiloxane polyoxamides and silicone urea block copolymers.

In some embodiments, the viscoelastic lightguide comprises a clear acrylic PSA, for example, those available as transfer tapes such as VHB™ Acrylic Tape 4910F or 4918 from 3M Company and 3M™ Optically Clear Laminating Adhesives (8140 and 8180 series).

In some embodiments, the viscoelastic lightguide comprises a block copolymer dispersed in an adhesive matrix to form a Lewis acid-base pair. In some embodiments, the viscoelastic lightguide comprises a stretch releasable PSA that can be removed from a substrate when stretched at or nearly at a zero degree angle.

In some embodiments the lightguide 610 may comprise an additional coating or a top film having a coating on the outer surface 605. The extra coating or film may be designed to any desirable property to the surface of the lightguide. Examples of coatings include, for example, hardcoats, anti-reflective coatings, anti-soiling coatings, matte coatings, anti-fog coatings, anti-scratch coatings, privacy coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. In some cases where the coating is provided as a film it is desirable to adhere the film to the surface 605 of the lightguide 610 with an adhesive having a refractive index that is less than the refractive index of the lightguide. Alternatively, a nano-voided layer may be disposed between the top surface 605 of the light guide 610 and the bottom of the additional top film.

As described above, lightguide 610 can be adhered to variable index light extraction layer 630 using an optically clear adhesive (OCA). In some embodiments, the OCA comprises a PSA having high light transmittance of from about 80 to about 100%, from about 90 to about 100%, from about 95 to about 100%, or from about 98 to about 100% over at least a portion of the visible light spectrum (about 400 to about 700 nm), and/or a haze value of from about 0.01 to less than about 5%, from about 0.01 to less than about 3%, or from about 0.01 to less than about 1%.

In some embodiments, useful PSAs include those described in the Dalquist criterion line (as described in Handbook of Pressure Sensitive Adhesive Technology, Second Ed., D. Satas, ed., Van Nostrand Reinhold, New York, 1989.) The PSA may have a particular peel force or at least exhibit a peel force within a particular range. For example, the PSA may have a 90° peel force of from about 10 to about 3000 g/in, from about 300 to about 3000 g/in, or from about 500 to about 3000 g/in. Peel force may be measured using a peel tester from IMASS.

The OCA may have a refractive index in the range of from about 1.3 to about 2.6, 1.4 to about 1.7, or from about 1.5 to about 1.7. The particular refractive index or range of refractive indices selected for the OCA may depend on the overall design of an optical film comprising the lightguide and the variable index light extraction layer. In general the OCA should have a refractive index approximately equal to or greater than that of the lightguide, and between that of the first and second regions of variable index light extraction layer 630.

The PSA used as the OCA may comprise any of the materials described above for the viscoelastic lightguide. Additional exemplary OCAs that are PSAs include tackified thermoplastic epoxies as described in U.S. Pat. No. 7,005, 394 (Ylitalo et al.), polyurethanes as described in U.S. Pat. No. 3,718,712 (Tushaus), polyurethane acrylates as described in US 2006/0216523 (Shusuke). In some embodiments, the adhesive comprises a clear acrylic PSA, for example, those available as transfer tapes such as VHB™ Acrylic Tape 4910F and 4918 from 3M Company, 3M™ Optically Clear Laminating Adhesives (8140 and 8180 series) and 3M™ Optically Clear Laminating Adhesives 8171 CL and 8172 CL) described in WO 2004/0202879. Useful OCAs are also described in US 2011/0039099 (Sherman et al.). In some embodiments, the OCA may comprise a PSA having a microstructured adhesive surface to allow for air bleed upon application to the surface of the lightguide as described, for example, in US 2007/0212535 (Sherman et al.).

The adhesive may comprise a stretch releasable PSA. Stretch releasable PSAs are PSAs that can be removed from a substrate if they are stretched at or nearly at a zero degree angle. In some embodiments, the adhesive or a stretch release PSA used as in the optical tape has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may comprise a silicone-based PSA as described in U.S. Pat. No. 6,569,521 B1 (Sheridan et al.) or U.S. Provisional Application Nos. 61/020,423 (Sherman et al.) and 61/036,501 (Determan et al.). Such silicone-based PSAs include compositions of an MQ tackifying resin and a silicone polymer. For example, the stretch releasable PSA may comprise an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof.

In some embodiments, the stretch releasable PSA may comprise an acrylate-based PSA as described in WO 2010/078346 (Yamanaka et al.) and WO 2010/077541 (Tran et al.) Such acrylate-based PSAs include compositions of an acrylate, an inorganic particle and a crosslinker. These PSAs can be a single or multilayer.

In some embodiments the adhesive layer may comprise the cured reaction product of a multifunctional ethylenically unsaturated siloxane polymer and one or more vinyl monomers as described in U.S. Pat. No. 7,862,898 (Sherman et al.) and U.S. Pat. No. 7,892,649 (Sherman et al.).

In some embodiments the use of self-wetting adhesives as described in WO 2010/132176 (Sherman et al.) and WO 2009/085662 (Sherman et al.) is beneficial in placement of the illumination device 600 onto a reflective scattering element.

An exemplary PSA comprises a polymer derived from an oligomer and/or monomer comprising polyether segments, wherein from 35 to 85% by weight of the polymer comprises the segments. These adhesives are described in US 2007/0082969 A1 (Malik et al.). Another exemplary PSA comprises the reaction product of a free radically polymerizable urethane-based or urea-based oligomer and a free radically polymerizable segmented siloxane-based copolymer; these adhesives are described in U.S. Provisional Application 61/410,510 (Tapio et al.).

The PSA can optionally include one or more additives such as nanoparticles, plasticizers, chain transfer agents, initiators, antioxidants, stabilizers, viscosity modifying agents, and antistats.

In some embodiments, a seal layer is disposed on the variable index light extraction layer in order to minimize penetration of contaminants into the latter. For example, a seal layer may be disposed on the variable index light extraction layer such that it is in between the variable index light extraction layer and an adhesive layer. For another example, a seal layer may be disposed on the variable index light extraction layer such that it is in between the variable index light extraction layer and the lightguide, and the seal layer has a refractive index that is approximately equal to or greater than that of the lightguide.

Suitable seal layers include pressure sensitive adhesive polymers and copolymers which can be acrylic or acrylate based, styrene butadiene, or styrene isoprene type copolymer thermoplastic resins and similar polymers so long as they do not contain a significant fraction of low molecular weight species capable of penetration into the nanovoided first region. Other polymer seal layers can be heat activated adhesive polymers including acrylics, acrylic-vinyl acetate, copolymers, block copolymers, EVA copolymers, polyamides, polyesters, polyethylene polymers and copolymers, polyisobutylene, polypropylene polymers and copolymers, polyurethane polymers and copolymers and other polymers including Surlyn plastic, vinyl acetate, and polyvinylidene fluoride polymers, their alloys, copolymers and derivatives with acid salt groups. These materials can be laminated with a direct film lamination, applied by melt coating or coated from an aqueous or solvent borne emulsion or dispersion of the polymer by any suitable coating method. Two example of suitable polymeric dispersions useful as seal layers are NEOCRYL A-614 and NEOPAC R-9699 (available from DSM (6401 JH Heerlen, Netherlands).

The light source is optically coupled to the lightguide such that at least some of the light from the light source can enter the lightguide. For example, a light source may be optically coupled to the lightguide such that greater than 1, greater than 10, greater than 20, greater than 30, greater than 40, greater than 50, greater than 90%, or about 100% of light emitted by the light source enters the lightguide. For another example, a light source may be optically coupled to the lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light source enters the lightguide. The light source may emit light having a random or a particular angular distribution.

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the lightguide. The light source may comprise LEDs arranged on a circuit such that light emitted from the LEDs lights up continuously or uniformly the lightguide throughout a desired area. The light source may comprise LEDs that emit light of different colors such that the colors can mix within the lightguide.

"LED" refers to a diode that emits light, whether visible, ultraviolet, or infrared. It includes incoherent encased or encapsulated semiconductor devices marketed as "LEDs," whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light.

An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies.

Multicolored light sources, whether or not used to create white light, can take many forms in a light assembly, with different effects on color and brightness uniformity of the light guide output area or surface. In one approach, multiple LED dies (e.g., a red, a green, and a blue light emitting die) are all mounted in close proximity to each other on a lead frame or other substrate, and then encased together in a single encapsulant material to form a single package, which may also include a single lens component. Such a source can be controlled to emit any one of the individual colors, or all colors simultaneously. In another approach, individually packaged LEDs, with only one LED die and one emitted color per package, can be clustered together for a given recycling cavity, the cluster containing a combination of packaged LEDs emitting different colors such as blue/yellow, red/green/blue, red/green/blue/white, or red/green/blue/cyan/yellow. Amber LEDs can also be used. In still another approach, such individually packaged multicolored LEDs can be positioned in one or more lines, arrays, or other patterns.

If desired, other visible light emitters such as linear cold cathode fluorescent lamps (CCFLs) or hot cathode fluorescent lamps (HCFLs) can be used instead of or in addition to discrete LED sources as illumination sources for the disclosed backlights. In addition, hybrid systems such as, for example, (CCFL/LED), including cool white and warm white, CCFL/HCFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs. The light sources may also include lasers, laser diodes, plasma light sources, or organic light emitting diodes, either alone or in combination with other types of light sources, e.g., LEDs.

For example, in some applications it may be desirable to replace the row of discrete light sources with a different light source such as a long cylindrical CCFL, or with a linear surface emitting light guide emitting light along its length and coupled to a remote active component (such as an LED die or halogen bulb), and to do likewise with other rows of sources. Examples of such linear surface emitting light guides are disclosed in U.S. Pat. No. 5,845,038 (Lundin et al.) and U.S. Pat. No. 6,367,941 (Lea et al.). Fiber-coupled laser diode and other semiconductor emitters are also known, and in those cases the output end of the fiber optic waveguide can be considered to be a light source with respect to its placement in the disclosed recycling cavities or otherwise behind the output area of the backlight. The same is also true of other passive optical components having small emitting areas such as lenses, deflectors, narrow light guides, and the like that give off light received from an active component such as a bulb or LED die. One example of such a passive component is a molded encapsulant or lens of a side-emitting packaged LED. Any suitable side-emitting LED can be used for one or more light sources, e.g., Luxeon™ LEDs (available from Lumileds, San Jose, Calif.), or the LEDs described, e.g., in U.S. Pat. No. 7,525,126 (Leatherdale et al.) and US 2007/0257270 (Lu et al.).

Light which enters the lightguide can be collimated such that it is incident on an interface between the lightguide and another medium at angles less than 50 degrees, less that 40 degrees, less than 30 degree, less than 20 degree or less than 10 degrees, where the incident angles are measured in respect to the surface normal of the lightguide injection interface. There are many ways to produce collimated light including but not limited to: 1. provide an LED light source or sources with highly collimating lenses; 2. provide an LED light source or sources that are disposed inside of a reflective wedge, where the wedge has an interior angle of less than 20 degrees, less than 15 degrees or less than 10 degrees; 3. provide an LED light source or sources where the LED light sources are disposed at approximately the focal point of a compound parabolic concentrator designed to collimate the light to desired injection angles; 4. provide an LED light source or sources where emission is perpendicular to the plane of the lightguide and the light is incident on a half parabolic mirror which is designed to collimate the light injected into the lightguide; and 5. provide an LED light source or sources disposed to emit light at the surface of the lightguide, which has a surface relief structure to allow light to enter the lightguide only at supercritical angles.

A method of preparing a variable index light extraction layer comprises: providing a nanovoided polymeric layer having a first refractive index; and printing a additional material on the nanovoided polymeric layer such that the additional material substantially penetrates the nanovoided polymeric layer, thereby forming a variable index light extraction layer comprising a first region comprising a portion of the nanovoided polymeric layer and a second region comprising another portion of the nanovoided polymeric layer and the additional material; wherein the first and second regions are disposed such that for light being transported at a supercritical angle in an adjacent layer, the variable index light extraction layer selectively extracts the light in a predetermined way based on the geometric arrangement of the first and second regions.

Printing may comprise non-impact or impact printing, and digital or analogue printing. For example, the additional material (also referred to as the additional material or another material) can be printed on the nanovoided polymeric layer using flexographic printing wherein a gravure roll having pits filled with the additional material transfers the material to a flexographic roll having a stamp with a desired arrangement of shapes. A layer of the nanovoided polymeric material is passed over and in contact with the stamp which effectively stamps or prints the web with the additional material thus transferring the additional material from the pattern of the flexographic roll to the surface of the nanovoided layer. The additional material then penetrates into the nanovoided layer, in some cases penetrating the entire thickness of the nanovoided layer. In most cases, the material is hardened by curing such as curing with UV radiation. This process can be carried out in a batch wise printing process or in continuous roll to roll process where a continuous web comprising the nanovoided polymeric layer is passed over the flexographic roll, which results in printing a repeating pattern or continuous pattern of the additional material onto the nanovoided layer.

Printing may also comprise other processes including but not limited to rotogravure printing, screen printing, inkjet printing (aqueous, solvent or solid-based inks may be used), letterpress printing, offset printing, heat transfer methods using heat sensitive substrates, thermal dye transfer and dye sublimation printing, dot-matrix printing, and printing with daisy wheels.

In general, reflective scattering element 650 can include a wide variety of materials, assemblies and/or devices. In general, reflective scattering element 650 is designed to take light delivered from the variable index light extraction layer 630 and reflect it back through the extraction layer and through outer surface 605 of lightguide 610. The reflective scattering element 650 may be chosen such that the desired light distribution is emitted through outer surface 605 of the lightguide 610. In some cases reflective scattering element 650 is chosen such that the light incident on reflective scattering element 650 is transformed into a substantially lambertian area light source.

In general, an element is considered a reflective scattering element if exhibits diffuse or semispecular reflection. Diffuse reflection is the reflection of light from a surface such that an incident ray is reflected at many angles rather than at just one angle as in the case of specular reflection. An illuminated ideal diffuse reflecting surface will have equal luminance from all directions in the hemisphere surrounding the surface (Lambertian reflectance). Semi-specular is the reflection of light from a surface such that an incident ray is reflected at multiple angles rather than at just one angle as in the case of a specular reflector. In many cases a semi-specular reflector has predominantly forward scattering where the reflected light is spread around the specular reflected angle with at least greater than 5% of the reflected light being outside of a 2 degree come centered around the specular angle. In some cases greater than about 50% of light incident from any angle is reflected outside of a 2 degree cone centered around the incident angle.

Suitable materials for reflective scattering element 650 include diffuse reflective and semispecular reflective materials and surfaces. Reflecting scattering elements as defined herein have either diffuse reflection or semispecular reflection. For diffuse reflective materials, a single incident light ray having an angle of incidence is reflected at many angles rather than at just one angle as in the case of specular reflection. An illuminated ideal diffuse reflecting surface will have equal luminance from all directions in the hemisphere surrounding the surface (Lambertian reflectance). Generally, a diffuse reflective material, reflects light such that rays are scattered in both forward and backward directions (backward scattering means that light is directed back toward the direct from which it came). A semispecular reflective material is a material that provides diffuse reflection, but for a single incident ray of light, the reflected rays of light are reflected within a narrow range of angles. Generally, the light reflect from a semi-specular reflective material is forward directed and a minority of the light is reflected backward to the direction from which it was incident. In some cases for the invention described herein, reflective scattering element 650 provides diffuse reflection for the light delivered from the lightguide such that greater than 10% of the reflected light is outside of the range of angles defined by the range of angles of the incident light.

Suitable reflective scattering elements include any scattering material, for example, plaster, white paper, fibrous materials like non-woven fiber mats and cloth, inorganic filled white reflective polymers (inorganic particle filled polymers such as polyesters, polyolefins, and the like), ceramic materials, crystalline surfaces (for example marble, natural quartz or stone), and voided polymer materials (for example those made using phase separation techniques such as solvent induced phases separation and thermal induced phase separation). Any voided polymeric materials may be suitable as a reflective scattering element. In some embodiments, the reflective scattering element comprises a graphic such as a sign, marking or picture. Examples of semi-specular reflective scattering materials include rough reflective metal surface, structured specularly reflective surfaces, specularly reflective surfaces having diffuse coatings over the specularly reflective surface (for example, an enhanced specular reflector such as Vikuiti™ ESR from 3M Co. which comprises a multilayer optical film having a diffuse coating on a surface thereof). Some examples include brushed aluminum and chrome, metals surfaces that have been modified by embossing, "peening", physical or chemical etching, or any other method that imparts a surface roughness. Alternatively, a diffusive coating could be applied on, or placed as a free-standing element over a specular reflector. A film having a surface structure or roughness could be placed over or laminated to a specular material. The reflective scattering element can take the form of inks, paint, or coatings. Printed graphics made by such methods as digital printing, silk screen, etc. are reflective scattering elements. A painted wall is a reflective scattering element. In some cases the reflective scattering element comprises a reflective display device.

As mentioned above, lightguide 610 and reflective scattering element 650 are optically coupled with the top and bottom surfaces, 625 and 635 respectively, of the variable index light extraction layer. This optical coupling in many cases means that there are no air gaps between variable index light extraction layer 630, lightguide 610 and reflective scattering element 650.

Figure 7:
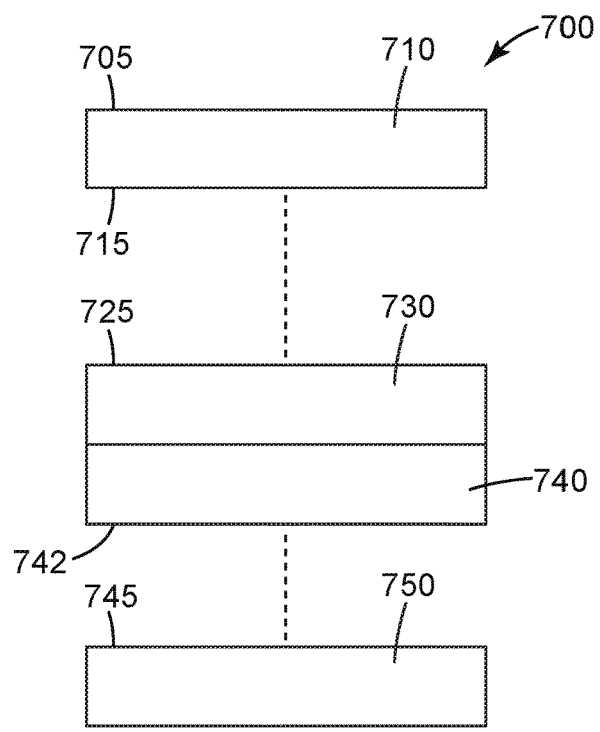
FIG. 7 shows a schematic of an exemplary illumination assembly comprising the variable light extraction layer in combination with a reflective scattering element.

FIG. 7 shows a schematic of an exemplary illumination assembly comprising the variable light extraction layer in combination with a reflective scattering element. In this embodiment, variable index light extraction layer 730 is made on transparent substrate 740 which is incorporated into the illumination assembly. Surface 725 of variable index light extraction layer 730 is optically coupled to lightguide 710, and bottom side 742 of transparent substrate 740 is optically coupled to reflective scattering element 750. Suitable transparent substrates are described above.

In many cases optical coupling between variable index light extraction layer 730 and lightguide 710 and reflective scattering element 750 means that there are no air gaps in between the surfaces of the layers (i.e. there are no air gaps between surfaces 715 and 725 and no air gaps between surfaces 742 and 745). Surface 742 of transparent substrate 740 can be adhered to surface 745 of reflective scattering element 750 using any means for example by using an optically clear pressure sensitive adhesive. Transparent substrate 740 may have some level of haze and can provide some light scattering, as long as the scattered light is predominantly in the forward direction toward reflective scattering element 750.

Figure 8:
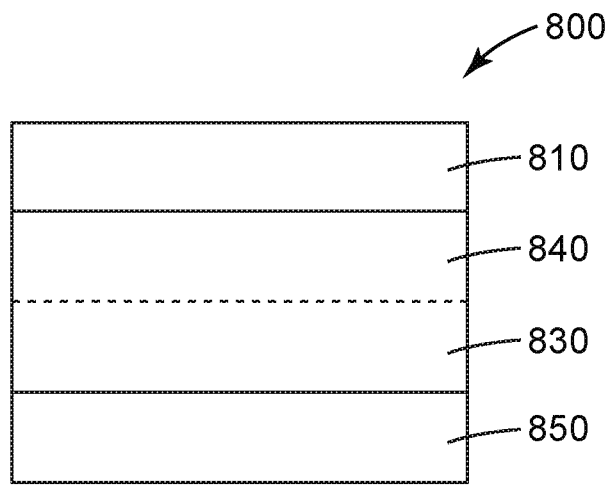
FIGS. 8, 9, 10a-10d and 11 show schematic cross-sectional views of exemplary illumination assemblies comprising the variable index light extraction layer optically coupled to a lightguide and a reflective scattering element.

FIGS. 8, 9, 10a-10d and 11 show schematic cross-sectional views of exemplary illumination assemblies comprising the variable index light extraction layer optically coupled to a lightguide and a reflective scattering element. FIG. 8 shows illumination assembly 800 where variable index light extraction layer 830 is formed directly on the surface of reflective scattering element 850. Lightguide 810 is adhered directly to variable light extraction layer 830 by means of optically clear adhesive 840 which may be a PSA. Adhesive layer 840 preferentially has low haze, high optical clarity and high transmission.

Figure 9:
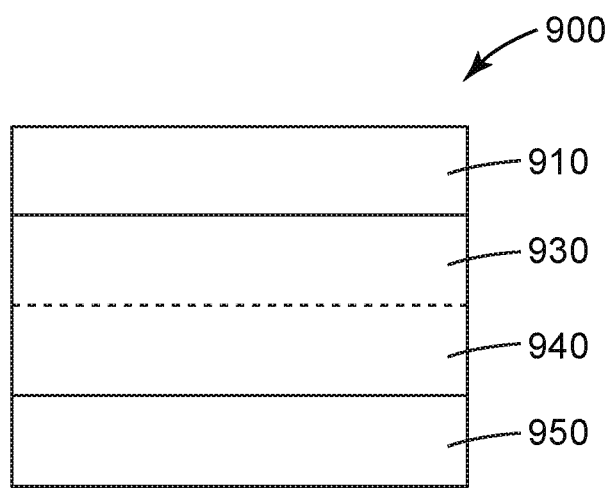

FIG. 9 shows illumination assembly 900 where variable index light extraction layer 930 is formed on the surface of lightguide 910. Reflective scattering element 950 is attached to variable index light extraction layer 930 by means of optically clear adhesive 940 which may be a PSA. Adhesive layer 940 can have low haze, high optical clarity and high transmission. Alternatively, adhesive layer 940 may have some level of haze and can provide some light scattering, as long as the scattered light is predominantly in the forward direction toward reflective scattering element layer 950.

Figure 10A:
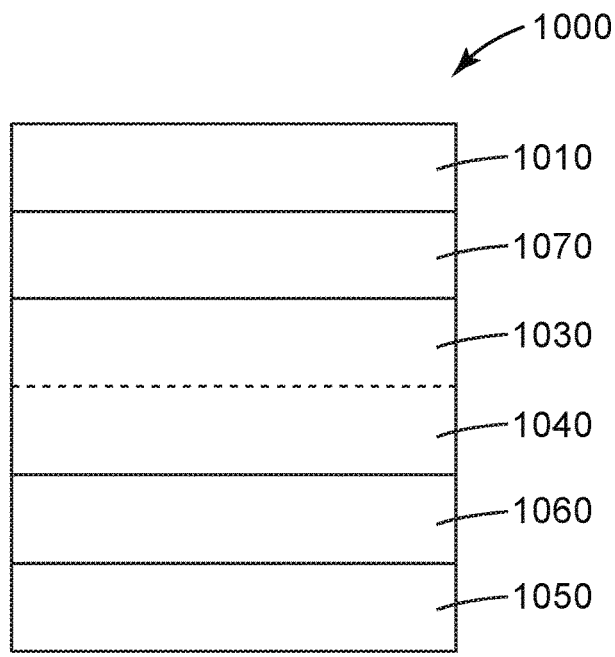

FIG. 10*a* shows illumination assembly 1000 where variable index light extraction layer 1030 is disposed on transparent substrate 1040. Variable index light extraction layer 1030 is adhered to lightguide 1010 by adhesive layer 1070. Adhesive layer 1070 preferentially has low haze, high optical clarity and high transmission for the wavelength or wavelengths of light propagating in lightguide 1010. Transparent substrate 1040 on which the variable index extraction layer is disposed is adhered to reflective scattering element layer 1050 by adhesive layer 1060. Adhesive layer 1060 can have low haze, high optical clarity and high transmission. Alternatively, adhesive layer 1060 may have some level of haze and can provide some light scattering, as long as the scattered light is predominantly in the forward direction toward reflective scattering element layer 1050.

Figure 10B:
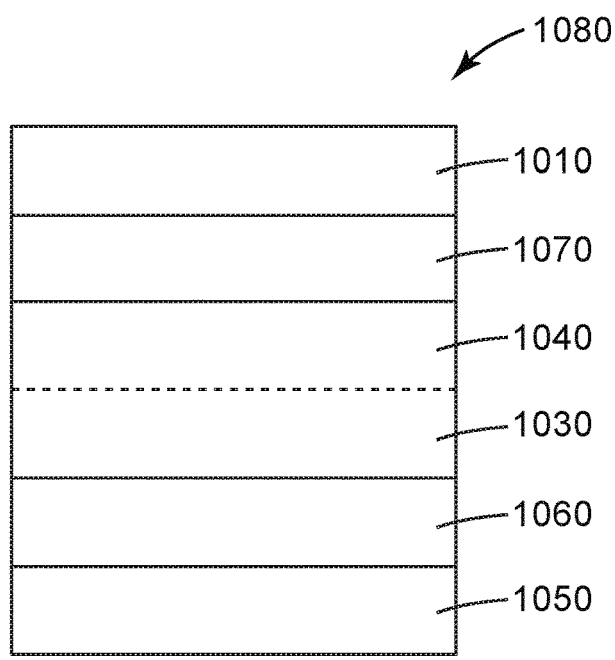

FIG. 10*b* shows illumination assembly 1080 where the orientation of variable index light extraction layer 1030 disposed on transparent substrate 1040 has been flipped as compared to illumination assembly 1000 shown in FIG. 10*a*. Variable index light extraction layer 1030 can be adhered to reflective scattering element layer 1050 by adhesive layer 1060 which can have low haze, high optical clarity and high transmission, or it may have some level of haze and can provide some light scattering, as long as the scattered light is predominantly in the forward direction toward reflective scattering element layer 1050. Transparent substrate 1040 on which the variable index light extraction layer is disposed is bonded to lightguide 1010 by adhesive layer 1070. Adhesive layer 1070 preferentially has low haze, high optical clarity and high transmission for the wavelength or wavelengths of light propagating in lightguide 1010.

Figure 10C:
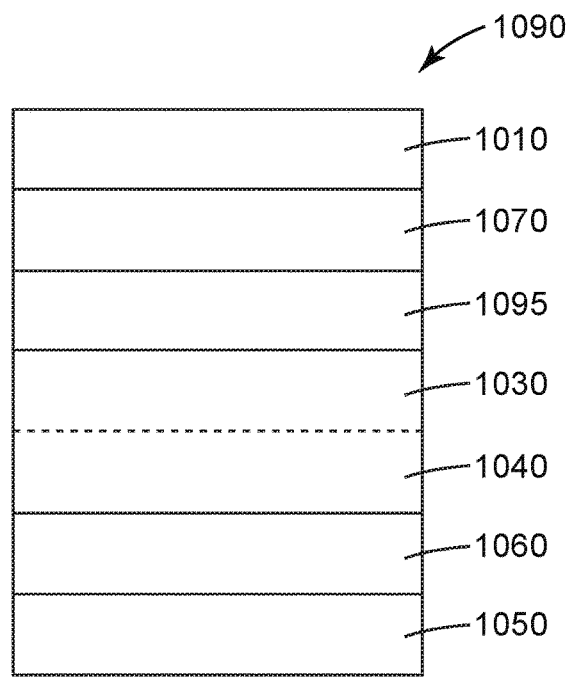
Figure 10D:
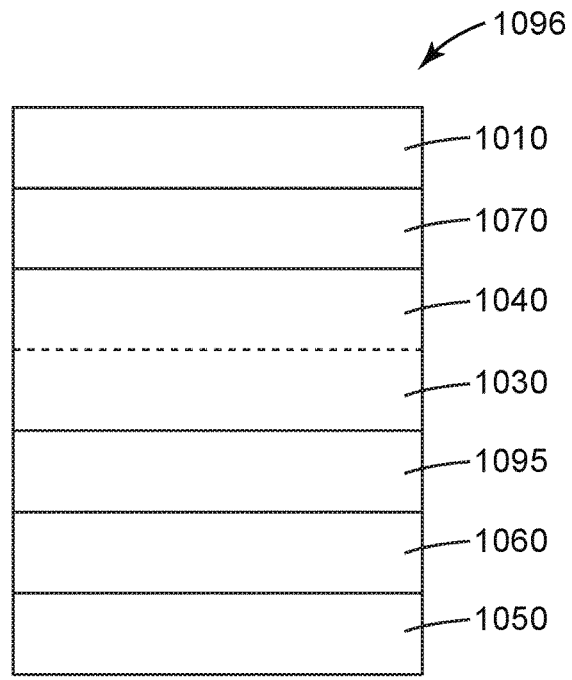

FIG. 10*c* shows illumination assembly 1090 which is similar to illumination assembly 1000 shown in FIG. 10*a*, except that assembly 1090 comprises seal layer 1095 disposed between variable index extraction layer 1030 and adhesive layer 1070. FIG. 10*d* shows illumination assembly 1096 which is similar to illumination assembly 1080 shown in FIG. 10*b*, except that assembly 1096 comprises seal layer 1095 disposed between variable index light extraction layer 1030 and adhesive layer 1060. Seal layers can be used to minimize contamination of the variable index light extraction layer as described above. Suitable materials which may be used as seal layers are described above.

In general, for the illumination assemblies shown in FIGS. 10*a*-10*d*, adhesive layer 1070 adjacent lightguide 1010 should have a refractive index that is approximately equal to or greater than the refractive index of the lightguide. In FIG. 10*c*, seal layer 1095 should also have a refractive index that is approximately equal to or greater than the refractive index of the lightguide.

In general, any layer disposed between the variable index extraction layer and the lightguide should have a refractive index that is approximately equal to or greater than the refractive index of the lightguide. Also in general, the second region of the variable index light extraction layer should have a refractive index approximately equal to or greater than the refractive index of the lightguide, and the first region should have a refractive index less than that of the lightguide.

Figure 11:
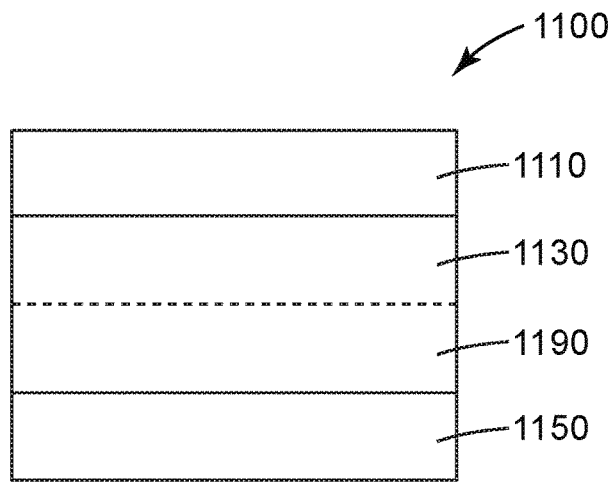

FIG. 11 shows illumination assembly 1100 comprising lightguide 1110 optically coupled to variable index light extraction layer 1130, and additional layer 1190 is disposed between the variable index light extraction layer and reflective scattering element 1150 such that the variable index light extraction layer and the reflective scattering element are optically coupled. The additional layer may comprise materials such as UV absorbers, UV stabilizers, dyes, down converting materials such as fluorophores, nanophosphors, quantum dots, or optical brighteners.

In general, any layer disposed between the variable index light extraction layer and the reflective scattering element can have low haze, high optical clarity and high transmission, or it may have some level of haze and can provide some light scattering, as long as the scattered light is predominantly in the forward direction toward the reflective scattering element. In general, any layer disposed between the variable index light extraction layer and the reflective scattering element can include the materials described above for the additional layer. In general, any layer between the variable index light extraction layer and the reflective scattering element may comprise additional materials such as UV absorbers, UV stabilizers, dyes, down converting materials such as fluorophores, nanophosphors, quantum dots, or optical brighteners. The reflective scattering element may also comprise additional materials such as UV absorbers, UV stabilizers, dyes, down converting materials such as fluorophores, nanophosphors, quantum dots, or optical brighteners.

Figure 12:
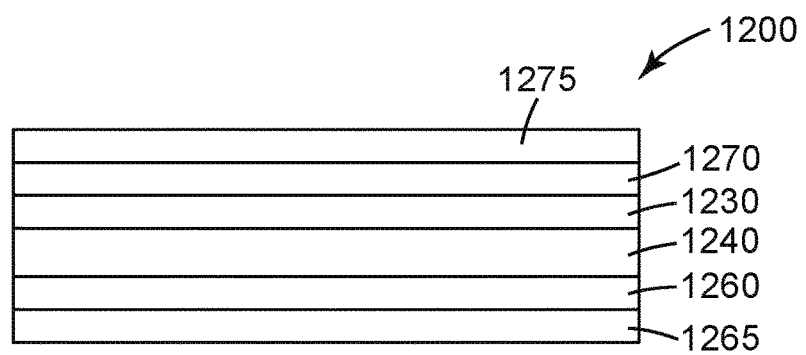
FIG. 12 shows a schematic cross-sectional view of an exemplary optical film comprising the variable index light extraction layer.

FIG. 12 shows a schematic cross-sectional view of an exemplary optical film comprising the variable index light extraction layer. Optical film 1200 comprises variable index light extraction layer 1230 disposed on transparent substrate 1240. First optically clear adhesive layer 1270 is disposed on variable index light extraction layer 1230 opposite the transparent substrate, and first release liner 1275 is disposed on layer 1270 opposite layer 1230. Second optically clear adhesive layer 1260 is disposed on transparent substrate 1240 opposite variable index light extraction layer 1230, and second release liner 1265 is disposed on layer 1260 opposite transparent substrate 1240. This optical film 1200 can be used in conjunction with a light guide and a reflective scattering element layer to make illumination devices for applications in general illumination (for example task lighting, room lighting, under cabinet lighting, and automotive interior lighting) or for backlighting applications (for example backlighting of liquid crystal displays suitable for mobile handheld, computer monitor and notebook, and TV and digital signage applications, backlighting of any other transparent display types that are transmissive and graphics made by any means, for example graphics made by printing methods), or can be used as a front light with reflective display devices and graphics to make front illuminated reflective display devices or graphics.

Release liners typically have a low adhesion surface for contact with an adhesive layer. The first and/or second release liners may comprise paper such as Kraft paper, or polymeric films such as poly(vinyl chloride), polyester, polyolefin, cellulose acetate, ethylene vinyl acetate, polyurethane, and the like. The release liner may be coated with a layer of a release agent such as a silicone-containing material or a fluorocarbon-containing material. The release liner may comprise paper or a polymeric film coated with polyethylene which is coated with a silicone-containing material. Exemplary release liners include liners commercially available from CP Films Inc. under the trade designations "T-30" and "T-10" that have a silicone release coating on polyethylene terephthalate film. Exemplary release liners include structured release liners. Exemplary release liners include any of those referred to as microstructured release liners which are used to impart a microstructure on the surface of an adhesive layer. The microstructured surface can aid air egress between the adhesive layer and a surface to which the adhesive layer is applied.

Figure 13A:
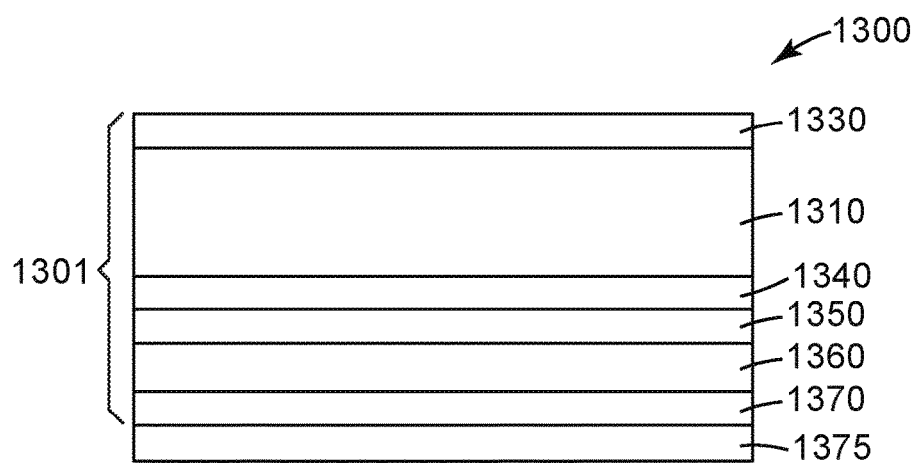
FIG. 13a shows a schematic cross-sectional view of an exemplary optical film and illumination article comprising the variable index light extraction layer optically coupled to a lightguide.

FIG. 13a shows a schematic cross-sectional view of an exemplary optical film and illumination article comprising the variable index light extraction layer optically coupled to a lightguide. Optical film 1300 comprises illumination article 1301 and release liner 1375. Illumination article 1301 comprises lightguide 1310 disposed on transparent substrate 1340, and protective outer layer 1330 is disposed on the lightguide opposite the transparent substrate. The opposing side of transparent substrate 1340 is optically coupled to lightguide 1310. Variable index light extraction layer 1350 is disposed on transparent substrate 1340 opposite the lightguide, and adhesive layer 1070 is disposed on the variable index light extraction layer opposite the transparent substrate. In this embodiment, lightguide 1310 preferably comprises a PSA as described above. Optional seal layer 1360 is disposed between variable index light extraction layer 1350 and adhesive layer 1370. Release liner 1375 is disposed on an outer surface of adhesive layer 1370. Exemplary seal layers and release liners are described above.

Illumination article 1301 can have a haze value of less than about 10%, an optical clarity greater than about 85% and a light transmittance of greater than about 90%. In some cases illumination article 1301 can have a haze value of less than about 7%, an optical clarity greater than about 90%, and a light transmittance of greater than about 92%. Optical transmittance, clarity and haze can be measured using a Haze-Gard Plus haze meter (available from BYK-Gardiner).

Figure 13B:
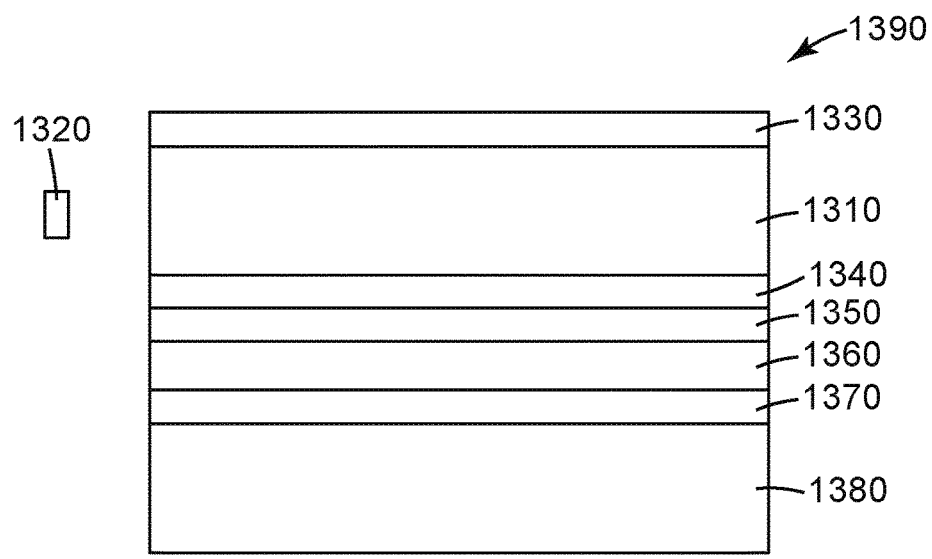
FIG. 13b shows a schematic of an exemplary illumination device comprising the illumination article shown in FIG. 13a in combination with a light source and reflective scattering element.

FIG. 13b shows a schematic of exemplary illumination device 1390 comprising the illumination article shown in FIG. 13a in combination with a light source and reflective scattering element. Release liner is removed from illumination article 1301, and the article is then applied to reflective scattering element 1380.

For any of the illumination articles or display devices described above, the structure of the article or device need not be flat or planar as shown in the figures. The structure of the article or device may be curved, up to and including curved into a tube shape and lit from the end. The structure of the article or device may alternatively be shaped light a 1 D tunnel. In general the structure of the articles and devices may take on the shape of a curve including compound curvature and may have applications in curved displays and general illumination and decorative lighting.

The reflective display may comprise any type of display which reflects light as an image toward a viewer. Reflective displays rely on ambient light for information display and hence are ideal devices for portable electronic equipment as they do not require a backlight for illumination. Reflective displays are used in a wide range of applications including handheld electronic devices such as e-books, computer monitors, televisions, instrument panels, signage, etc.

The reflective display may comprise a liquid crystal display (LCD) which is a type of flat panel display that uses the light modulating properties of liquid crystals. A typical reflective display comprising an LCD comprises a pair of rigid and/or flexible substrates with a liquid crystal material sealed in between the substrates. The liquid crystal material is viewable through the front side of the display which typically comprises a transparent electrode. In the case of a reflective display, the other substrate that forms the back of the display provides a reflective surface. Simply stated, the LCD operates when liquid crystal molecules in the liquid crystal material change their conformation in response to an applied electric filed generated between electrodes which are part of the display. The reflective display may further include an additional member or material such as an anti-reflection film, barrier film or brightness enhancement film. The liquid crystal material may be dispersed as droplets in a polymer matrix; these types of displays are known as polymer liquid crystal displays (PDLCs).

The reflective display may comprise an electrophoretic display panel designed to mimic the appearance of ordinary ink on paper. In the simplest implementation of an electrophoretic display, a mixture of titanium oxide particles dispersed in a hydrocarbon oil with dark-colored dye and charging agents is disposed between two conductive plates. Upon application of a voltage, the particles migrate electrophoretically to the front (viewing) side of the display which then appears white due to scattering of light. When the particles are located at the rear side of the display, it appears dark because incident light is absorbed by the colored dye. Thus, images are created by reflecting and absorbing regions. Electrophoretic displays are used in devices such as Amazon Kindle, Barnes & Noble Nook and Sony Reader.

The reflective display may comprise an electrofluidic display. One example of an electrofluidic display is an electrowetting display, a relatively new technology, originally described in "Video-Speed Electronic Paper Based on Electrowetting" by R. A. Hayes and B. J. Feenstra in *Nature*, Vol. 425, 383-385 (25 Sep. 2003) and developed by Liquavista BV. Electrowetting displays comprise a transparent electrode, hydrophobic insulator, a colored oil layer and water, sandwiched between glass or polymeric substrates. In equilibrium the colored oil naturally forms a stable continuous film between the water and the hydrophobic insulator. When a voltage difference is applied across the hydrophobic insulator, the system lowers its energy by moving the water into contact with the insulator, thereby displacing the oil and exposing the underlying reflecting surface. The balance between electrostatic and surface tension forces determines how far the oil is moved to the side. In this way the optical properties of the stack when viewed from above can be continuously tuned between a colored off-state and a transparent on-state, provided the pixel is sufficiently small so that the eye averages the optical response. Another example of an electrofluidic display are electrofluidic displays made using "Young-Laplace Transposition of Brilliant Pigment Dispersions" described by J. Heikenfeld et al. in *Nature Photonics*, Vol. 3, 292-296 (26 Apr. 2009). The technology is being developed by Gamma Dynamics. The technology is a three dimensional microfluidic display device that provides a direct view of brilliantly coloured pigment dispersions. The basic electrofluidic structure has several important geometrical features. The first is a reservoir that will hold an aqueous pigment dispersion in less than 5-10% of the visible area. The second feature is a surface channel occupying 80-95% of the visible area; this receives the pigment dispersion from the reservoir when a suitable stimulus is applied. Third, there is a duct surrounding the device that enables counterflow of a nonpolar fluid (oil or gas) as the pigment dispersion leaves the reservoir. It is important to note that all of these features are inexpensively formed in a single photolithographic or microreplication step. Several additional coatings and a top substrate are added to the reservoir structure. The surface channel is first bound by two electrowetting plates consisting of an electrode and hydrophobic dielectric. The top electrowetting plate is composed of a transparent $In_2O_3$:$SnO_2$ electrode (ITO) so that the surface channel may be viewed by the naked eye. The bottom electrowetting plate comprises a highly reflective electrode made from aluminium, for example. With this arrangement, when no voltage is applied, a net Young-Laplace pressure causes the pigment dispersion to occupy the cavity, which imparts a larger radius of curvature on the pigment dispersion. Therefore at equilibrium, the pigment dispersion occupies the reservoir and is largely hidden from view. This is analogous to connecting two soap bubbles by a straw—the larger bubble has a larger radius of curvature and a lower Young-Laplace pressure, and will therefore consume the smaller bubble. When a voltage is applied between the two electrowetting plates and the pigment dispersion, an electromechanical pressure is induced that exceeds the net Young-Laplace pressure, and the pigment dispersion is pulled into the surface channel. If the volume of the pigment dispersion is slightly greater than the volume of the surface channel, then the pigment will be simultaneously viewable in both the reservoir and the surface channel, and nearly the entire device area will exhibit the coloration of the pigment. If the voltage is removed the pigment dispersion rapidly (milliseconds to tens of milliseconds) recoils into the reservoir. Thus a switchable device is created that can hide the pigment or reveal the pigment with a visual brilliance that is similar to pigment printed on paper.

The reflective display may comprise an interferometric display which can create various colors through interference of reflected light. One type of interferometric display is the Mirasol® display based on the iMoD™ element developed by Qualcomm MEMS Technologies. This type of interferometric element is an electrostatically actuated, bistable MEMS device built on a transparent substrate. The element consists of a suspended conductive membrane serving as a mirror, over a partially reflective optical stack. Between the membrane and the stack is a gap of a few hundred nanometers and filled with air. Interference between light reflected from the mirror and from the partially reflective optical stack generates color, and black is perceived when the element is in the collapsed state. Colored pixels have elements with different air gaps designed to reflect in the red, green and blue wavelengths.

The reflective display may comprise an electronic paper display panel designed to mimic the appearance of ordinary ink on paper. The first electronic paper, called Gyricon, consists of polyethylene spheres between 75 and 106 micrometers across. Each sphere is a janus particle composed of negatively charged black plastic on one side and positively charged white plastic on the other (each bead is thus a dipole). The spheres are embedded in a transparent silicone sheet, with each sphere suspended in a bubble of oil so that they can rotate freely. The polarity of the voltage applied to each pair of electrodes then determines whether the white or black side is face-up, thus giving the pixel a white or black appearance.

In some cases the reflective surface of the display resides inside of a cavity defined by the reflective part of the display and top surface of the devices. The top surfaces may comprise glass, polymer films, coatings, or even touch active surfaces, for example capacitive touch screens. Thus in some embodiments the illumination articles described herein (for example illumination article 1301) are attached to these outer surfaces and not the directly to the reflective element of the reflective display. In general, the illumination article must be optically coupled to the reflective element of the reflective display device, in that the light extracted from the light guide 1310 in FIG. 13*b* by the variable index extraction layer 1350 is delivered to the reflective surface of the reflective display device. In some cases, the top surfaces of the reflective displays are optically coupled to the reflective surface in the reflective display element of the display device in the sense that there are no air gaps between the top surface and the reflective display element of the display device. In some embodiments, the refractive index of the top surface and other layers of the reflective display device above the reflective element of the display have a refractive index that is greater than the nanovoided polymeric first region of the variable index light extraction layer. In some cases the refractive index of the layers in the display device that are between the reflective surface or element of the display are equal to or higher than the index of the lightguide of the illumination article 1301. In some cases the layers in the display device that are between the reflective surface or reflective element of the display have refractive indices that are lower than the light guide but the refractive indices are within 0.05 of the refractive index of the lightguide, or are within 0.03 of the refractive index of the lightguide.

EXAMPLES

The following materials were used as received.

| Component | % Solid | Amount (g) |
| --- | --- | --- |
| A-174 Silica Nalco 2327, Ondeo Nalco Chemical Co. | 43.40 | 482.84 |
| Aliphatic Urethane Acrylate, available from Sartomer Corporation as CN 9893 | 100.00 | 42.67 |
| Pentaerythritol Triacrylate, available from Sartomer Corporation as SR 444 | 100.00 | 167.69 |
| Isopropanol, available from Sartomer Corporation as IPA | --- | 250.03 |
| Ethyl Acetate, available from Sigma-Aldrich | --- | 250.03 |
| Photoinitiator, available from BASF Corporation as IRGACURE 184 | 100.00 | 5.84 |
| Photoinitiator, available from BASF Corporation as IRGACURE 819 | 100.00 | 1.12 |

Example 1

Preparation of Coating Formulation

The following were added in a 1-liter wide-mouth amber bottle, according to the amounts shown in the above table: 5.70 g of CN 9893, 22.40 g of SR 444, 5.84 g of IRGACURE 184 and 1.12 g of IRGACURE 819. The bottle was capped and shaken for 2 hours to dissolve CN9893 (batch is clear). This solution is referred to as Resin Premix.

The following were added to a 2000 mL poly bottle: 482.84 g of A-174 treated NALCO 2327 and the Resin Premix. The two components were mixed by transferring the batch back and forth between the two bottles. End with the batch in the 2000 mL bottle. To the 2000 mL bottle was added IRGACURE 184 and IRGACURE 819. The solution was shaken for 30 minutes to dissolve photoinitiators. The resulting batch was a translucent, low-viscosity dispersion.

The batch above was diluted to ~17.7% solids by weight with a 50/50 blend ethyl acetate and propylene glycol methyl ether (available from Dow Chemical as DOWANOL PM).

Preparation of Nanovoided Polymeric Layer

The above coating formulation was coated onto 50 um PET film (MELINEX 617 available from DuPont) using a slot die at a line speed of 3.1 m/min. The wet coating thickness was approximately 14 um. In an inert chamber (<50 ppm $O_2$), the wet coating was partially cured in-line at the same line speed with UV radiation at 395 nm and dose of 850 mJ/cm$^2$ (UV radiation was provided by UV-LEDs available from Cree, Inc.). The partially cured coating sample was then dried at 70° C. in a 9 meter oven, and under a nitrogen-purged atmosphere, finally cured with a 236 Watt/cm$^2$ Fusion H bulb (available from Fusion UV Systems, Inc.). The resulting nanovoided polymeric layer had a thickness of approximately 2.5 um. The transmission was 94.8%, the haze was 0.66% and the clarity was 99.9% as measured using a BYK Gardner Haze Gard Plus (Columbia, Md.). The refractive index of the nanovoided layer was between 1.20 and 1.22 as measured using a Metricon Prism Coupler (Metricon Corporation, Pennington, N.J.).

Formation of Variable Index Light Extraction Layer

The nanovoided polymeric layer was printed with a UV curable clear ink (UV OP1005 GP Varnish from Nazdar, Shawnee, Kans.) using an indirect gravure printing process. A flexographic tool having a gradient pattern of 200 um wide lines was fabricated (by Southern Graphics Systems, Brooklyn Park, Minn.) based on a pdf image that defined the gradient line pattern as determined by optical modeling and ray tracing. A gravure roll (pyramidal and 9 cubic um per square um) was rated to give a wet coating of approximately 9.65 um. The printing was done at 10 meters per minute with high intensity UV curing under a nitrogen-purged atmosphere with a 236 Watt/cm$^2$ Fusion H bulb (available from Fusion UV Systems, Inc.) after the printing. The resulting printed layer was an optical film comprising: first regions having a first refractive index and comprising nanovoided polymeric material, and second regions wherein the nanovoids are filled or partially filed with the cured clear ink, the second regions having a second refractive index greater than that of the first regions. The variable index light extraction layer having first and second regions was disposed on the DuPont 617 PET substrate. The optical properties of the variable index light extraction layer on PET was measured using a BYK Gardner Haze Gard Plus on two sides, the side with low density of second high index regions and the side with high density of high index regions. For the low density side, the transmission was 94.9%, the haze was 2.88%, the clarity was 99.2%. For the high density side, the transmission was 94.4%, the haze was 5.09%, the clarity was 97.6% (note the transmission is not corrected for Fresnel reflection). The refractive index of the cured ink was measured to be approximately 1.525 as measured on a flat cured sample using a Metricon prism coupler (wavelength of light used to measure the refractive index was 589 nm).

Front Lit Reflective Display Device

A light guide comprising a PSA layer (VHB Acrylic Tape 4918 from 3M Company) was obtained, having an area of 90 mm×120 mm and a thickness of 2 mm. On one major surface of the lightguide was disposed a transparent protective layer of 50 um PET film. The PET substrate on which the variable index light extraction layer was disposed was adhered to the opposing major surface of the lightguide directly. To the exposed face of the variable light extraction layer was bonded a pressure sensitive adhesive (SOKEN 2147, available from Soken Chemical and Engineering Co., Ltd., Japan) to act as a seal layer. This assembly, with the protective layer facing up, was adhered to the viewing panel of an electrophoretic electronic-book (Kindle by Amazon) using a self-wetting adhesive (see PCT US2010/031689 and WO 2009/085662).

A light engine assembly was obtained and consisted of 20 edge-emitting white LEDs (NSSW230T from Nichia) mounted in a bezel. Two reflectors comprising multilayer polymeric mirror film (Vikuiti™ ESR from 3M Co.) were also included in the bezel to form an optical wedge to collimate the light emitted from the LEDs. A slight angle of around 10° was built into the bezel to provide optical collimation. The light from the LED engine was designed to emit into an air gap region such that the light was injected at supercritical angles into the edge of the light guide along the left side of the vertical axis of the display. This resulted in a front-lit reflective display device where the front light assembly does not negatively affect the image on the display when looking through the light guide assembly having the variable index light extraction layer (i.e. little to not distortion of the image).

Figure 14A:
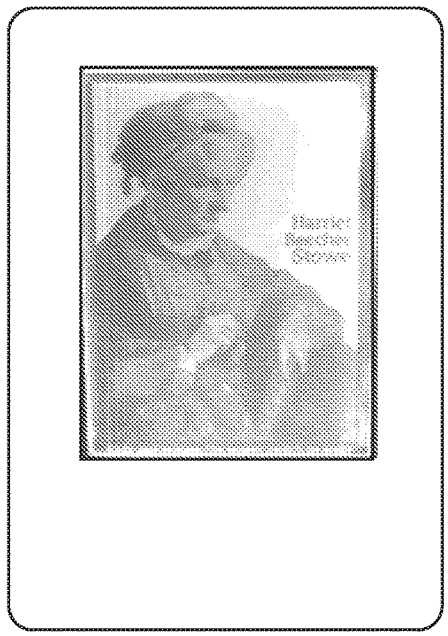
FIGS. 14a and 14b show displayed images from schematically illustrated reflective display devices with a front light, with and without the variable index extraction layer, respectively.

The LEDs of the illumination device were turned on, resulting in uniform illumination of the reflective display device, i.e., the reflective display panel as can be seen in FIG. 14a.

Comparative Example 1

Figure 14B:
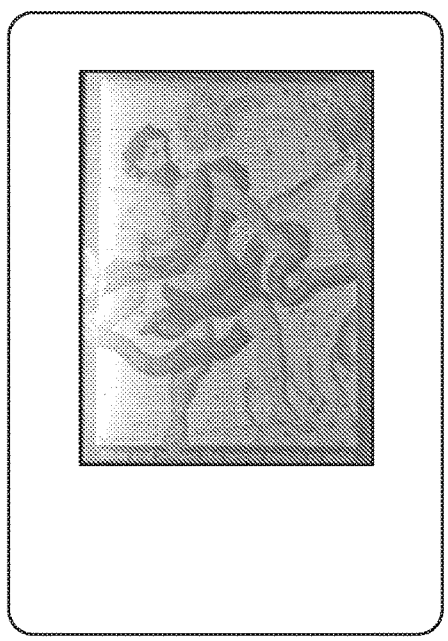

Front Lit Reflective Display Device without the Variable Index Light Extraction Layer A front-lit reflective display device was assembled as described above for Example 1 with the exception that the variable index light extraction layer on PET support was not included. The PSA lightguide was adhered to the viewing panel of the electronic book using the self-wetting adhesive. (The self-wetting adhesive was used in order to facilitate rework of the assembly when the lightguide was removed from the electronic book at a later time). FIG. 14b shows an image displayed on the front lit device and it is immediately apparent that the luminance uniformity across the display is poor.

Example 2

Preparation of Coating Formulation

The following were added in a 1-liter wide-mouth amber bottle, according to the amounts shown in the above table: 5.70 g of CN 9893, 22.40 g of SR 444, 5.84 g of IRGACURE 184 and 1.12 g of IRGACURE 819. The bottle was capped and shaken for 2 hours to dissolve CN9893 (batch is clear). This solution is referred to as Resin Premix.

The following were added to a 2000 mL poly bottle: 482.84 g of A-174 treated NALCO 2327 and the Resin Premix. The two components were mixed by transferring the batch back and forth between the two bottles. End with the batch in the 2000 mL bottle. To the 2000 mL bottle was added IRGACURE 184 and IRGACURE 819. The solution was shaken for 30 minutes to dissolve photoinitiators. The resulting batch was a translucent, low-viscosity dispersion.

The batch above was diluted to ~17.7% solids by weight with a 50/50 blend ethyl acetate and propylene glycol methyl ether (available from Dow Chemical as DOWANOL PM).

Preparation of Nanovoided Polymeric Layer

The above coating formulation was coated onto 50 um PET film (MELINEX 617 available from DuPont) using a slot die at a line speed of 3.1 ml/min. The wet coating thickness was approximately 8.1 um. In an inert chamber (<50 ppm O$_2$), the wet coating was partially cured in-line at the same line speed with UV radiation at 395 nm and dose of 850 mJ/cm$^2$. (UV radiation was provided by UV-LEDs available from Cree, Inc.). The partially cured coating sample was then dried at 70° C. in a 9 meter oven, and under a nitrogen-purged atmosphere, finally cured with a 236 Watt/cm$^2$ Fusion H bulb (available from Fusion UV Systems, Inc.). The resulting nanovoided polymeric layer had a thickness of 1.3 um. The transmission was 96.4%, the haze was 1.33% and the clarity was 99.7% as measured using a BYK gardner Haze Gard Plus (Columbia, Md.). The refractive index of the nanovoided layer was between 1.20 and 1.22 as measured at 589 nm using a Metricon Prism Coupler (Metricon Corporation, Pennington, N.J.).

Formation of Variable Index Light Extraction Layer

The nanovoided polymeric layer was printed with a UV curable clear ink (UV OP1005 GP Varnish from Nazdar, Shawnee, Kans.) using an indirect gravure printing process. A flexographic tool having a random 100 um gradient dot pattern having a density gradient of second regions in the x direction (left to right) and a varying density in they direction at the left edge of the pattern as shown in FIG. 15a was fabricated (by Southern Graphics Systems) based on a pdf image that defined the dot pattern determined by optical ray tracing modeling. A gravure roll (pyramidal and 9 cubic um per square um) was rated to give a wet coating of approximately 9.65 um. The printing was done at 10 meters per minute with high intensity UV curing under a nitrogen-purged atmosphere with a 236 Watt/cm$^2$ Fusion H bulb (available from Fusion UV Systems, Inc.) after the printing. The resulting printed layer was an optical film comprising: first regions having a first refractive index and comprising nanovoided polymeric material, and second regions wherein the nanovoids are filled or partially filed with the cured clear ink, the second regions having a second refractive index greater than that of the first regions. The variable index light extraction layer having first and second regions was disposed on the DuPont 617 PET substrate. The optical properties of the variable index light extraction layer on PET was measured using a BYK Gardner Haze Gard Plus on two sides, the side with low density of second high index regions and the side with high density of high index regions. For the low density side, the transmission was 96.6%, the haze was 3.56%, the clarity was 95.6%. For the high density side, the transmission was 95.8%, the haze was 6.82%, the clarity was 89.9% (note the transmission is not corrected for Fresnel reflection). The refractive index of the cured ink was measured to be approximately 1.525 as measured on a flat cured sample using a Metricon prism coupler (wavelength of light used to measure the refractive index was 589 nm).

Front Lit Reflective Display Device

Figure 16A:
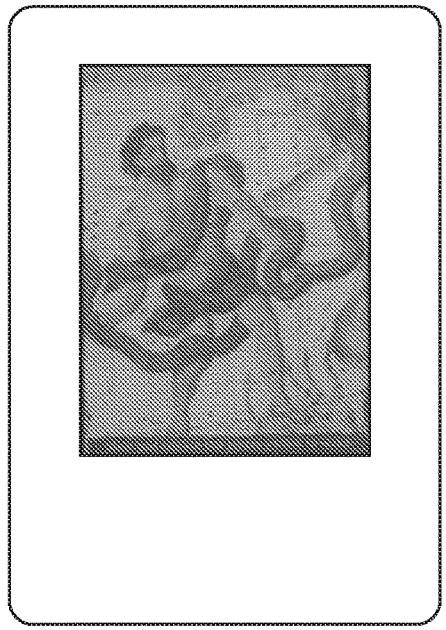
FIGS. 16a and 16b show displayed images from schematically illustrated reflective display devices with a front light having the variable index extraction layer, wherein the light is off and on, respectively.

A light guide comprising a PSA layer (VHB Acrylic Tape 4918 from 3M Company) was obtained, having an area of 90 mm×120 mm and a thickness of 2 mm. On one major surface of the lightguide was disposed a transparent protective layer of 50 um PET film. The PET substrate on which the variable index light extraction layer was disposed was adhered to the opposing major surface of the lightguide directly. To the exposed face of the variable light extraction layer was bonded a pressure sensitive adhesive (SOKEN 2147, available from Soken Chemical and Engineering Co., Ltd., Japan) to act as a seal layer. This assembly, with the protective layer facing up, was adhered to the viewing panel of an electrophoretic electronic-book (Kindle by Amazon) using a self-wetting adhesive (see PCT US2010/031689 and WO 2009/085662). A light engine assembly was made and consisted of 3 edge-emitting white LEDs (NSSW230T from Nichia) mounted in a bezel. Two reflectors comprising multilayer polymeric mirror film (Vikuiti™ ESR from 3M Co.) were also included in the bezel to form an optical wedge to collimate the light emitted from the LEDs. A slight angle of around 10° was built into the bezel to provide optical collimation. The light from the LED engine was designed to emit into an air gap region such that the light was injected at supercritical angles into the edge of the light guide along the horizontal top edge of the display. This resulted in a front-lit reflective display device where the front light assembly does not negatively affect the image on the display when looking through the light guide assembly having the variable index light extraction layer (i.e. little to not distortion of the image) with the front light off as can be seen in FIG. 16a.

Figure 16B:
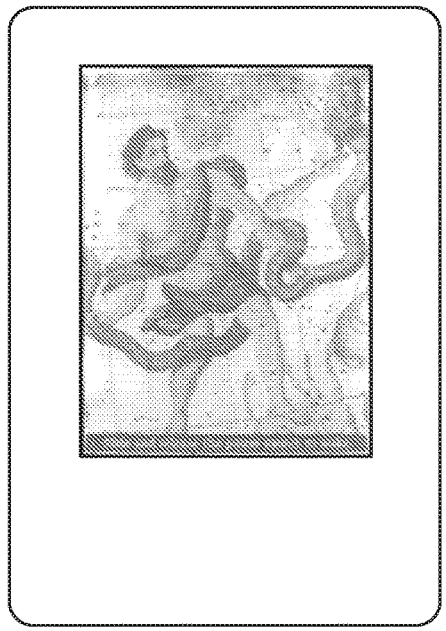
Figure 17A:
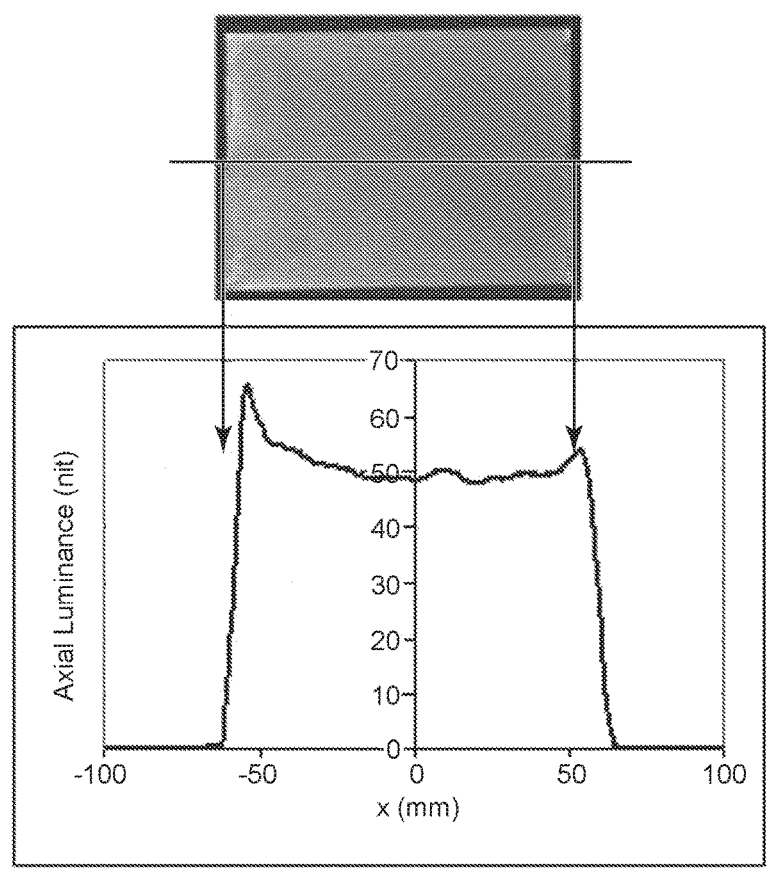
FIGS. 17a and 17b show prometric images and corresponding plots of axial luminance as a function of position for reflective display devices that are front-lit with and without the variable index extraction layer, respectively.

The LEDs of the illumination device were turned on, resulting in uniform illumination of the reflective display device, i.e., the reflective display panel as can be seen in FIG. 16b. The luminance uniformity was measured on the illuminated device using a Prometric camera (available from Radiant Imaging, Redmond, Wash.). FIG. 17a shows an image of the front lit device and a plot of the axial luminance as a function of position. The display uniformity is greater than 75% as measured using the formula ((max−min)/max× 100%).

Comparative Example 2

Figure 17B:
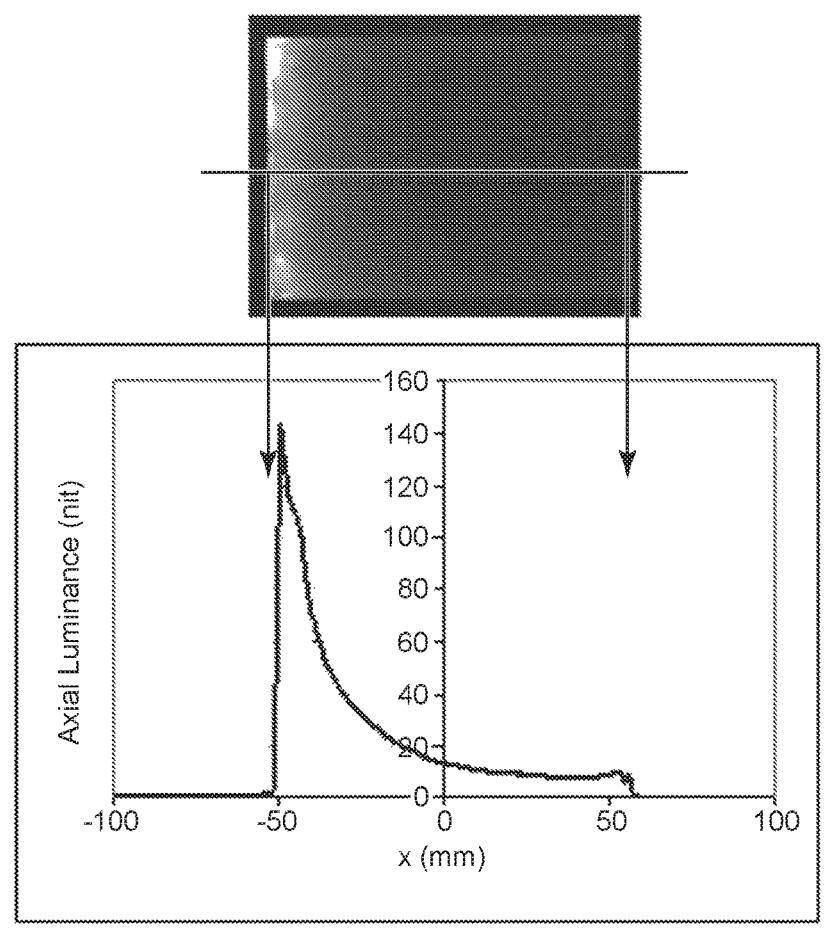

Front Lit Reflective Display Device without the Variable Index Light Extraction Layer A front-lit reflective display device was assembled as described above for Example 2 with the exception that the variable index light extraction layer on PET support was not included. The PSA lightguide was adhered to the viewing panel of the electronic book using the self-wetting adhesive. (The self-wetting adhesive was used in order to facilitate rework of the assembly when the lightguide was removed from the electronic book at a later time). The luminance uniformity was measured on the illuminated device using a Prometric camera (available from Radiant Imaging, Redmond, Wash.). FIG. 17b shows an image of the front lit device and a plot of the axial luminance as a function of position. It is immediately apparent that the display uniformity is poor. The luminance uniformity is less than 5% as measured using the formula ((max−min)/max×100%).

Example 3

Preparation of Coating Formulation

The following were added in a 1-liter wide-mouth amber bottle, according to the amounts shown in the above table: 5.70 g of CN 9893, 22.40 g of SR 444, 5.84 g of IRGACURE 184 and 1.12 g of IRGACURE 819. The bottle was capped and shaken for 2 hours to dissolve CN9893 (batch is clear). This solution is referred to as Resin Premix.

The following were added to a 2000 mL poly bottle: 482.84 g of A-174 treated NALCO 2327 and the Resin Premix. The two components were mixed by transferring the batch back and forth between the two bottles. End with the batch in the 2000 mL bottle. To the 2000 mL bottle was added IRGACURE 184 and IRGACURE 819. The solution was shaken for 30 minutes to dissolve photoinitiators. The resulting batch was a translucent, low-viscosity dispersion.

The batch above was diluted to ~17.7% solids by weight with a 50/50 blend ethyl acetate and propylene glycol methyl ether (available from Dow Chemical as DOWANOL PM).

Preparation of Nanovoided Polymeric Layer

The above coating formulation was coated onto 50 um PET film (MELINEX 617 available from DuPont) using a slot die at a line speed of 3.1 m/min. The wet coating thickness was approximately 14 um. In an inert chamber (<50 ppm O$_2$), the wet coating was partially cured in-line at the same line speed with UV radiation at 395 nm and dose of 850 mJ/cm$^2$. (UV radiation was provided by UV-LEDs available from Cree, Inc). The partially cured coating sample was then dried at 70° C. in a 9 meter oven, and under a nitrogen-purged atmosphere, finally cured with a 236 Watt/cm² Fusion H bulb (available from Fusion UV Systems, Inc.). The resulting nanovoided polymeric layer had a thickness of 2.3 um. The transmission was 95.8%, the haze was 2.49% and the clarity was 99.9% as measured using a BYK gardner Haze Gard Plus (Columbia, Md.). The refractive index of the nanovoided layer was between 1.20 and 1.22 as measured at 589 nm using a Metricon Prism Coupler (Metricon Corporation, Pennington, N.J.).

Formation of Variable Index Light Extraction Layer

The nanovoided polymeric layer was printed with a UV curable clear ink (UV OP1005 GP Varnish from Nazdar, Shawnee, Kans.) using an indirect gravure printing process. A flexographic tool having a random 100 um gradient dot pattern was fabricated (by Southern Graphics Systems) based on a pdf image that defined the dot pattern determined by optical ray tracing modeling. A gravure roll (pyramidal and 9 cubic um per square um) was rated to give a wet coating of approximately 9.65 um. The printing was done at 10 meters per minute with high intensity UV curing under a nitrogen-purged atmosphere with a 236 Watt/cm² Fusion H bulb (available from Fusion UV Systems, Inc.) after the printing. The resulting printed layer was an optical film comprising: first regions having a first refractive index and comprising nanovoided polymeric material, and second regions wherein the nanovoids are filled or partially filed with the cured clear ink, the second regions having a second refractive index greater than that of the first regions. The variable index light extraction layer having first and second regions was disposed on the DuPont 617 PET substrate. The optical properties of the variable index light extraction layer on PET was measured using a BYK Gardner Haze Gard Plus on two sides, the side with low density of second high index regions and the side with high density of high index regions. For the low density side, the transmission was 96.2%, the haze was 5.64%, the clarity was 97.5%. For the high density side, the transmission was 95.8%, the haze was 9.18%, the clarity was 94.4% (note the transmission is not corrected for Fresnel reflection). The refractive index of the cured ink was measured to be approximately 1.525 as measured on a flat cured sample using a Metricon prism coupler (wavelength of light used to measure the refractive index was 589 nm).

Example 4

Each of the optical films (the variable index light extraction layer on PET) from Examples 1-3 were used to assemble two different optical articles for the purposes of evaluating optical properties.

Optical Properties for Variable Index Light Extraction Layer Having a Seal Layer:

The first optical articles were formed by laminating a seal layer onto the exposed surface of the variable index light extraction layer (the side opposite the PET substrate). The seal layer was a pressure sensitive adhesive (Soken 2147, available from Soken Chemical and Engineering Co., Ltd., Japan). To the opposing side of the Soken PSA seal layer was laminated a 50 micron PET film. For each of the optical article using the variable index light extraction layers from examples 1-3 the transmission, haze and clarity were measured using a BYK Gardner Haze Gard Plus on the two sides of the variable index light extraction layer, the side with low density of second high index regions and the side with high density of high index regions. The results of the measurements are shown in Table 1 and Table 2 respectively.

TABLE 1

Optical properties of area with high density of second regions

| Example | Pattern | % Transmission | Haze (%) | Clarity (%) |
|---|---|---|---|---|
| 1 | 1-D lines y-gradient | 91.0 | 1.84 | 98.1 |
| 2 | 2-D dots x,y gradient | 92.0 | 3.35 | 92.1 |
| 3 | 2-D dots y-gradient | 91.9 | 6.96 | 95.7 |

TABLE 2

Optical properties of area with low density of second regions

| Example | Pattern | % Transmission | Haze (%) | Clarity (%) |
|---|---|---|---|---|
| 1 | 1-D lines y-gradient | 91.0 | 1.99 | 99.2 |
| 2 | 2-D dots x,y gradient | 92.3 | 1.87 | 95.6 |
| 3 | 2-D dots y-gradient | 91.7 | 4.38 | 98.2 |

Optical Properties for Lightguide Assembly with Variable Index Light Extraction Layer:

The second optical articles were formed by laminating a viscoelastic lightguide onto the exposed surface of the variable index light extraction layer (the side opposite the PET substrate). The viscoelastic lightguide was a pressure sensitive adhesive (PSA) with a thickness of 2 mm (VHB Acrylic Tape 4918 from 3M Company). To the opposite major surface of the lightguide was disposed a transparent protective layer of 50 um PET film. For each of the optical article using the variable index light extraction layers from examples 1-3 the transmission, haze and clarity were measured using a BYK Gardner Haze Gard Plus on the two sides of the variable index light extraction layer, the side with low density of second high index regions and the side with high density of high index regions. The results of the measurements are shown in Table 3 and Table 4 respectively. Table 5 shows reference measurements for the PET film (DuPont 617) used in the optical constructions and for the PSA lightguide having PET laminated to both surfaces.

TABLE 3

Optical properties of area with high density of second regions

| Example | Pattern | % Transmission | Haze (%) | Clarity (%) |
|---|---|---|---|---|
| 1 | 1-D lines y-gradient | 90.3 | 1.91 | 98.5 |
| 2 | 2-D dots x,y gradient | 91.0 | 3.76 | 91.6 |
| 3 | 2-D dots y-gradient | 90.6 | 6.80 | 95.8 |

TABLE 4

Optical properties of area with low density of second regions

| Example | Pattern | % Transmission | Haze (%) | Clarity (%) |
|---|---|---|---|---|
| 1 | 1-D lines y-gradient | 90.3 | 1.61 | 99.0 |

TABLE 4-continued

Optical properties of area with low density of second regions

| Example | Pattern | % Transmission | Haze (%) | Clarity (%) |
|---|---|---|---|---|
| 2 | 2-D dots x,y gradient | 90.3 | 2.37 | 96.8 |
| 3 | 2-D dots y-gradient | 90.1 | 4.16 | 98.2 |

TABLE 5

Reference Measurements:

| Example | Pattern | % Transmission | Haze (%) | Clarity (%) |
|---|---|---|---|---|
| Ref 1 | PET film | 92.8 | 0.67 | 100 |
| Ref 2 | PSA lightguide with PET film on both sides | 90.9 | 0.59 | 99.4 |

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An illumination article comprising:
a variable index light extraction layer comprising a first region and a second region, the first region comprising a nanovoided polymeric material, the second region comprising the nanovoided polymeric material and an additional material residing within nanovoids of the nanovoided polymeric material, and
one or more layers disposed on a same side of the variable index light extraction layer, the one or more layers comprising a light guide optically coupled to the variable index light extraction layer such that light transported in the light guide undergoes total internal reflection at a first interface between the first region and the one or more layers and passes through a second interface between the second region and the one or more layers.

2. The illumination article of claim 1, wherein the one or more layers further comprises an optically clear adhesive layer disposed on the variable index light extraction layer, an interface between the optically clear adhesive layer and the variable index light extraction layer comprising the first and second interfaces.

3. The illumination article of claim 1, wherein the first region has a first refractive index, the second region has a second refractive index, and the difference between the first and second refractive indices is about 0.03 to about 0.5.

4. The illumination article of claim 1, wherein the nanovoids of the nanovoided polymeric material comprises a plurality of interconnected nanovoids dispersed in a binder.

5. The illumination article of claim 1, wherein the first region has a first refractive index less than about 1.4.

6. The illumination article of claim 1, wherein the first region has a void volume of about 20 to about 60%.

7. The illumination article of claim 1, wherein the first region has a haze less than about 5% and a clarity greater than about 90%.

8. The illumination article of claim 1, wherein the second region has a void volume of less than about 20%.

9. The illumination article of claim 1, wherein the variable index light extraction layer has a light transmittance of greater than about 90%.

10. The illumination article of claim 1, wherein the second region comprises a plurality of second regions arranged in a pattern across a transverse plane of the variable index light extraction layer.

11. The illumination article of claim 1, wherein the second region comprises a plurality of second regions disposed randomly across a transverse plane of the variable index light extraction layer.

12. The illumination article of claim 1, wherein the first region is continuous across a transverse plane of the variable index light extraction layer.

13. The illumination article of claim 1, wherein the second region is discontinuous across a transverse plane of the variable index light extraction layer.

14. The illumination article of claim 1, wherein the second region comprises a plurality of second regions, and a density of the second regions varies in one dimension across a transverse plane of the variable index light extraction layer.

15. The illumination article of claim 1, wherein the second region comprises a plurality of second regions, and a density of the second regions varies in two dimensions across a transverse plane of the variable index light extraction layer.

16. The illumination article of claim 1, wherein the additional material comprises an ink.

17. The illumination article of claim 1, wherein the first region has a first refractive index, the second region has a second refractive index, and a refractive index of the light guide is greater than the first refractive index and less than or equal to the second refractive index.

18. The illumination article of claim 1, wherein there is no air gap between the light guide and the variable index light extraction layer.

19. The illumination article of claim 1, wherein the light guide comprises a viscoelastic light guide.

20. The illumination article of claim 1, wherein an interface between the light guide and the variable index light extraction layer comprises the first and second interfaces.

21. A display assembly comprising the illumination article of claim 1 and a reflective scattering substrate, wherein the reflective scattering substrate is optically coupled to the variable index light extraction layer and the light guide, and wherein the display assembly is a front-lit reflective display assembly.

22. The display assembly of claim 21, wherein the reflective scattering substrate comprises a reflective display.

* * * * *

UNITED STATES PATENT AND TRADEMARK OFFICE
CERTIFICATE OF CORRECTION

Page 1 of 2

PATENT NO. : 10,288,254 B2
APPLICATION NO. : 13/984239
DATED : May 14, 2019
INVENTOR(S) : Kevin Schaffer It is certified that error appears in the above-identified patent and that said Letters Patent is hereby corrected as shown below:

In the Specification

Column 6
Lines 35-47, delete "The refractive index profile shows a plot of distance d, which corresponds to a distance across a transverse plane of the layer, for the layer in plan view. FIG. 2 shows that at some initial position on the layer corresponding to $d_0$, the layer has first refractive index $n_1$ corresponding to the first region. Moving across the transverse plane of the layer, first refractive index $n_1$ is observed until reaching $d_1$ where the refractive index of the layer abruptly increases to $n_2$ which corresponds to the second refractive index of the second region. Continuing to move across the transverse plane of the layer, the second refractive index $n_2$ is observed until reaching $d_2$ where the refractive index of the layer abruptly decreases to $n_1$ indicating a second first region." and insert the same on Column 6, Line 34, after "layer" as a continuation of the same paragraph.

Column 30-31
Lines 42-67, delete "Another example of an electrofluidic display are electrofluidic displays made using "Young-Laplace Transposition of Brilliant Pigment Dispersions" described by J. Heikenfeld et al. in *Nature Photonics*, Vol. 3, 292-296 (26 Apr. 2009). The technology is being developed by Gamma Dynamics. The technology is a three dimensional microfluidic display device that provides a direct view of brilliantly coloured pigment dispersions. The basic electrofluidic structure has several important geometrical features. The first is a reservoir that will hold an aqueous pigment dispersion in less than 5-10% of the visible area. The second feature is a surface channel occupying 80-95% of the visible area; this receives the pigment dispersion from the reservoir when a suitable stimulus is applied. Third, there is a duct surrounding the device that enables counterflow of a nonpolar fluid (oil or gas) as the pigment dispersion leaves the reservoir. It is important to note that all of these features are inexpensively formed in a single photolithographic or microreplication step. Several additional coatings and a top substrate are added to the reservoir structure. The surface channel is first bound by two electrowetting plates consisting of an electrode and hydrophobic dielectric. The top electrowetting plate is composed of a transparent $In_2O_3:SnO_2$ electrode (ITO) so that the surface Signed and Sealed this
Third Day of December, 2019

Andrei Iancu
*Director of the United States Patent and Trademark Office* channel may be viewed by the naked eye. The bottom electrowetting plate comprises a highly reflective electrode made from aluminium, for example. With this arrangement, when no voltage is applied, a net Young-Laplace pressure causes the pigment dispersion to occupy the cavity, which imparts a larger radius of curvature on the pigment dispersion. Therefore at equilibrium, the pigment dispersion occupies the reservoir and is largely hidden from view. This is analogous to connecting two soap bubbles by a straw—the larger bubble has a larger radius of curvature and a lower Young-Laplace pressure, and will therefore consume the smaller bubble. When a voltage is applied between the two electrowetting plates and the pigment dispersion, an electromechanical pressure is induced that exceeds the net Young-Laplace pressure, and the pigment dispersion is pulled into the surface channel. If the volume of the pigment dispersion is slightly greater than the volume of the surface channel, then the pigment will be simultaneously viewable in both the reservoir and the surface channel, and nearly the entire device area will exhibit the coloration of the pigment. If the voltage is removed the pigment dispersion rapidly (milliseconds to tens of milliseconds) recoils into the reservoir. Thus a switchable device is created that can hide the pigment or reveal the pigment with a visual brilliance that is similar to pigment printed on paper." and insert the same on Column 30, Line 43, as a new paragraph.

Column 34
Line 50, delete "17.7%" and insert -- ~17.7% --, therefor.

Column 34
Line 57, delete "3.1 ml/min." and insert -- 3.1 m/min. --, therefor.

Column 35
Line 12, delete "they" and insert -- the y --, therefor.